United States Patent
Song et al.

(10) Patent No.: US 10,690,794 B2
(45) Date of Patent: Jun. 23, 2020

(54) METHOD AND SYSTEM FOR PERFORMING OPERATIONS USING COMMUNICATIONS FOR A HYDROCARBON SYSTEM

(71) Applicants: Limin Song, West Windsor, NJ (US); Yibing Zhang, Annandale, NJ (US); Mark M. Disko, Glen Gardner, NJ (US); Scott W. Clawson, Califon, NJ (US); Badrinarayanan Velamur Asokan, Houston, TX (US); Xiaohua Yi, Houston, TX (US)

(72) Inventors: Limin Song, West Windsor, NJ (US); Yibing Zhang, Annandale, NJ (US); Mark M. Disko, Glen Gardner, NJ (US); Scott W. Clawson, Califon, NJ (US); Badrinarayanan Velamur Asokan, Houston, TX (US); Xiaohua Yi, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 8 days.

(21) Appl. No.: 16/175,441

(22) Filed: Oct. 30, 2018

(65) Prior Publication Data

US 2019/0154859 A1    May 23, 2019

Related U.S. Application Data

(60) Provisional application No. 62/588,067, filed on Nov. 17, 2017.

(51) Int. Cl.
*G01V 1/46* (2006.01)
*E21B 47/12* (2012.01)
(Continued)

(52) U.S. Cl.
CPC .............. *G01V 1/46* (2013.01); *E21B 47/011* (2013.01); *E21B 47/122* (2013.01); *E21B 47/14* (2013.01);
(Continued)

(58) Field of Classification Search
CPC ...... E21B 47/16; E21B 47/011; E21B 47/122; E21B 47/14; G01V 1/46; G01V 11/002; G01V 1/247
See application file for complete search history.

(56) References Cited

U.S. PATENT DOCUMENTS

| 3,103,643 A | 9/1963 | Kalbfell | 340/17 |
| 3,205,477 A | 9/1965 | Kalbfell | 340/18 |

(Continued)

FOREIGN PATENT DOCUMENTS

| CN | 102733799 | 6/2014 | ............. E21B 47/16 |
| EP | 0636763 | 2/1995 | ............. E21B 47/12 |

(Continued)

OTHER PUBLICATIONS

U.S. Appl. No. 15/666,334, filed Aug. 1, 2017, Walker, Katie M. et al.

(Continued)

*Primary Examiner* — Ryan W Sherwin
(74) *Attorney, Agent, or Firm* — ExxonMobil Upstream Research Company—Law Department

(57) ABSTRACT

A method and system are described for communicating within a system, which may be along tubular members. The method includes constructing a communication network for a hydrocarbon system, which includes one or more wellbores accessing a subsurface region or a pipeline, and using the communication network in hydrocarbon operations, such as hydrocarbon exploration, hydrocarbon development, and/or hydrocarbon production.

25 Claims, 7 Drawing Sheets

(51) Int. Cl.
  *E21B 47/14* (2006.01)
  *E21B 47/16* (2006.01)
  *E21B 47/01* (2012.01)
  *G01V 11/00* (2006.01)
  *G01V 1/24* (2006.01)

(52) U.S. Cl.
  CPC ............ *E21B 47/16* (2013.01); *G01V 11/002* (2013.01); *G01V 1/247* (2013.01)

(56) References Cited

U.S. PATENT DOCUMENTS

| | | | |
|---|---|---|---|
| 3,512,407 A | 5/1970 | Zill | 73/152 |
| 3,637,010 A | 1/1972 | Malay et al. | 166/51 |
| 3,741,301 A | 6/1973 | Malay et al. | 166/191 |
| 3,781,783 A | 12/1973 | Tucker | 340/18 |
| 3,790,930 A | 2/1974 | Lamel et al. | 340/18 |
| 3,900,827 A | 8/1975 | Lamel et al. | 340/18 |
| 3,906,434 A | 9/1975 | Lamel et al. | 340/18 |
| 4,001,773 A | 1/1977 | Lamel et al. | 340/18 |
| 4,283,780 A | 8/1981 | Nardi | 367/82 |
| 4,298,970 A | 11/1981 | Shawhan et al. | 367/82 |
| 4,302,826 A | 11/1981 | Kent et al. | 367/82 |
| 4,314,365 A | 2/1982 | Peterson et al. | 367/82 |
| 4,884,071 A | 11/1989 | Howard | 340/854 |
| 4,962,489 A | 10/1990 | Medlin et al. | 367/32 |
| 5,128,901 A | 7/1992 | Drumheller | 367/82 |
| 5,136,613 A | 8/1992 | Dumestre, III | 375/1 |
| 5,166,908 A | 11/1992 | Montgomery | 367/165 |
| 5,182,946 A | 2/1993 | Boughner et al. | 73/151 |
| 5,234,055 A | 8/1993 | Cornette | 166/278 |
| 5,283,768 A | 2/1994 | Rorden | 367/83 |
| 5,373,481 A | 12/1994 | Orban et al. | 367/82 |
| 5,468,025 A | 11/1995 | Adinolfe et al. | 285/114 |
| 5,480,201 A | 1/1996 | Mercer | 294/67.31 |
| 5,495,230 A | 2/1996 | Lian | 340/551 |
| 5,562,240 A | 10/1996 | Campbell | 227/130 |
| 5,592,438 A | 1/1997 | Rorden et al. | 367/83 |
| 5,667,650 A | 9/1997 | Face et al. | 204/298.07 |
| 5,850,369 A | 12/1998 | Rorden et al. | 367/83 |
| 5,857,146 A | 1/1999 | Kido | 455/38.3 |
| 5,924,499 A | 7/1999 | Birchak et al. | 175/40 |
| 5,960,883 A | 10/1999 | Tubel et al. | 166/313 |
| 5,995,449 A | 11/1999 | Green et al. | 367/83 |
| 6,049,508 A | 4/2000 | Deflandre | 367/48 |
| 6,125,080 A | 9/2000 | Sonnenschein et al. | 367/134 |
| 6,128,250 A | 10/2000 | Reid et al. | 367/153 |
| 6,177,882 B1 | 1/2001 | Ringgenberg et al. | 340/853.7 |
| 6,236,850 B1 | 5/2001 | Desai | 455/343 |
| 6,239,690 B1 | 5/2001 | Burbidge et al. | 340/10.33 |
| 6,300,743 B1 | 10/2001 | Patino et al. | 320/106 |
| 6,320,820 B1 | 11/2001 | Gardner et al. | 367/81 |
| 6,324,904 B1 | 12/2001 | Ishikawa et al. | 73/152.03 |
| 6,360,769 B1 | 3/2002 | Brisco | 137/268 |
| 6,394,184 B2 | 5/2002 | Tolman et al. | 166/281 |
| 6,400,646 B1 | 6/2002 | Shah et al. | 367/82 |
| 6,429,784 B1 | 8/2002 | Beique et al. | 340/853.2 |
| 6,462,672 B1 | 10/2002 | Besson | 340/853.2 |
| 6,543,538 B2 | 4/2003 | Tolman et al. | 166/284 |
| 6,670,880 B1 | 12/2003 | Hall et al. | 336/132 |
| 6,679,332 B2 | 1/2004 | Vinegar et al. | 166/373 |
| 6,695,277 B1 | 2/2004 | Gallis | 241/191 |
| 6,702,019 B2 | 3/2004 | Dusterhoft et al. | 166/278 |
| 6,717,501 B2 | 4/2004 | Hall et al. | 336/132 |
| 6,727,827 B1 | 4/2004 | Edwards et al. | 340/854.9 |
| 6,772,837 B2 | 8/2004 | Dusterhoft et al. | 166/278 |
| 6,816,082 B1 | 11/2004 | Laborde | 340/853.3 |
| 6,868,037 B2 | 3/2005 | Dasgupta et al. | 367/54 |
| 6,880,634 B2 | 4/2005 | Gardner et al. | 166/250.01 |
| 6,883,608 B2 | 4/2005 | Parlar et al. | 166/278 |
| 6,899,178 B2 | 5/2005 | Tubel | 166/313 |
| 6,909,667 B2 | 6/2005 | Shah et al. | 367/83 |
| 6,912,177 B2 | 6/2005 | Smith | 367/82 |
| 6,920,085 B2 | 7/2005 | Finke et al. | 367/83 |
| 6,930,616 B2 | 8/2005 | Tang et al. | 340/854.4 |
| 6,940,392 B2 | 9/2005 | Chan et al. | 340/10.4 |
| 6,940,420 B2 | 9/2005 | Jenkins | 340/855.6 |
| 6,953,094 B2 | 10/2005 | Ross et al. | 166/381 |
| 6,956,791 B2 | 10/2005 | Dopf et al. | 367/82 |
| 6,980,929 B2 | 12/2005 | Aronstam et al. | 702/188 |
| 6,987,463 B2 | 1/2006 | Beique et al. | 340/856.3 |
| 7,006,918 B2 | 2/2006 | Economides et al. | 702/1 |
| 7,011,157 B2 | 3/2006 | Costley et al. | 166/311 |
| 7,036,601 B2 | 5/2006 | Berg et al. | 166/385 |
| 7,051,812 B2 | 5/2006 | McKee et al. | 166/305.1 |
| 7,064,676 B2 | 6/2006 | Hall et al. | 350/853.1 |
| 7,082,993 B2 | 8/2006 | Ayoub et al. | 166/250.1 |
| 7,090,020 B2 | 8/2006 | Hill et al. | 166/373 |
| 7,140,434 B2 | 11/2006 | Chouzenoux et al. | 166/250.11 |
| 7,219,762 B2 | 5/2007 | James et al. | 181/105 |
| 7,224,288 B2 | 5/2007 | Hall et al. | 340/853.7 |
| 7,228,902 B2 | 6/2007 | Oppelt | 166/250.02 |
| 7,249,636 B2 | 7/2007 | Ohmer | 166/383 |
| 7,252,152 B2 | 8/2007 | LoGiudice et al. | 166/386 |
| 7,257,050 B2 | 8/2007 | Stewart et al. | 367/82 |
| 7,261,154 B2 | 8/2007 | Hall et al. | 166/242.2 |
| 7,261,162 B2 | 8/2007 | Deans et al. | 166/336 |
| 7,275,597 B2 | 10/2007 | Hall et al. | 166/297 |
| 7,277,026 B2 | 10/2007 | Hall et al. | 340/854.8 |
| RE40,032 E | 1/2008 | van Bokhorst et al. | 455/343.2 |
| 7,317,990 B2 | 1/2008 | Sinha et al. | 702/6 |
| 7,321,788 B2 | 1/2008 | Addy et al. | 455/574 |
| 7,322,416 B2 | 1/2008 | Burris, II et al. | 166/308.1 |
| 7,325,605 B2 | 2/2008 | Fripp et al. | 166/250.01 |
| 7,339,494 B2 | 3/2008 | Shah et al. | 340/855.7 |
| 7,348,893 B2 | 3/2008 | Huang et al. | 340/854.3 |
| 7,385,523 B2 | 6/2008 | Thomeer et al. | 340/854.8 |
| 7,387,165 B2 | 6/2008 | Lopez de Cardenas et al. | 166/313 |
| 7,411,517 B2 | 8/2008 | Flanagan | 340/854.4 |
| 7,477,160 B2 | 1/2009 | Lemenager et al. | 340/853.1 |
| 7,516,792 B2 | 4/2009 | Lonnes et al. | 166/308.1 |
| 7,551,057 B2 | 6/2009 | King et al. | 340/5.72 |
| 7,590,029 B2 | 9/2009 | Tingley | 367/82 |
| 7,595,737 B2 | 9/2009 | Fink et al. | 340/854.4 |
| 7,602,668 B2 | 10/2009 | Liang et al. | 367/25 |
| 7,649,473 B2 | 1/2010 | Johnson et al. | 340/853.1 |
| 7,750,808 B2 | 7/2010 | Masino et al. | 340/572.1 |
| 7,775,279 B2 | 8/2010 | Marya et al. | 166/297 |
| 7,787,327 B2 | 8/2010 | Tang et al. | 366/27 |
| 7,819,188 B2 | 10/2010 | Auzerais et al. | 155/250 |
| 7,828,079 B2 | 11/2010 | Oothoudt | 175/20 |
| 7,831,283 B2 | 11/2010 | Ogushi et al. | 455/574 |
| 7,913,773 B2 | 3/2011 | Li et al. | 175/40 |
| 7,952,487 B2 | 5/2011 | Montebovi | 340/636.1 |
| 7,994,932 B2 | 8/2011 | Huang et al. | 340/854.3 |
| 8,004,421 B2 | 8/2011 | Clark | 340/854.4 |
| 8,044,821 B2 | 10/2011 | Mehta | 340/855.7 |
| 8,049,506 B2 | 11/2011 | Lazarev | 324/333 |
| 8,115,651 B2 | 2/2012 | Camwell et al. | 340/853.2 |
| 8,117,907 B2 | 2/2012 | Han et al. | 73/152.58 |
| 8,157,008 B2 | 4/2012 | Lilley | 166/253.1 |
| 8,162,050 B2 | 4/2012 | Roddy et al. | 166/253.1 |
| 8,220,542 B2 | 7/2012 | Whitsitt et al. | 166/278 |
| 8,237,585 B2 | 8/2012 | Zimmerman | 340/854.6 |
| 8,242,928 B2 | 8/2012 | Prammer | 340/853.7 |
| 8,276,674 B2 | 10/2012 | Lopez de Cardenas et al. | 166/373 |
| 8,284,075 B2 | 10/2012 | Fincher et al. | 340/854.4 |
| 8,284,947 B2 | 10/2012 | Giesbrecht et al. | 381/66 |
| 8,316,936 B2 | 11/2012 | Roddy et al. | 166/253.1 |
| 8,330,617 B2 | 12/2012 | Chen et al. | 340/854.6 |
| 8,347,982 B2 | 1/2013 | Hannegan et al. | 175/5 |
| 8,358,220 B2 | 1/2013 | Savage | 340/853.1 |
| 8,376,065 B2 | 2/2013 | Teodorescu et al. | 175/40 |
| 8,381,822 B2 | 2/2013 | Hales et al. | 166/377 |
| 8,388,899 B2 | 3/2013 | Mitani et al. | 422/179 |
| 8,411,530 B2 | 4/2013 | Slocum et al. | 367/90 |
| 8,434,354 B2 | 5/2013 | Crow et al. | 73/152.04 |
| 8,494,070 B2 | 7/2013 | Luo et al. | 375/262 |
| 8,496,055 B2 | 7/2013 | Mootoo et al. | 166/278 |
| 8,539,890 B2 | 9/2013 | Tripp et al. | 109/25 |
| 8,544,564 B2 | 10/2013 | Moore et al. | 175/50 |
| 8,552,597 B2 | 10/2013 | Song et al. | 307/149 |

(56) References Cited

U.S. PATENT DOCUMENTS

| | | | |
|---|---|---|---|
| 8,556,302 B2 | 10/2013 | Dole | 285/367 |
| 8,559,272 B2 | 10/2013 | Wang | |
| 8,596,359 B2 | 12/2013 | Grigsby et al. | 166/278 |
| 8,605,548 B2 | 12/2013 | Froelich | 367/82 |
| 8,607,864 B2 | 12/2013 | Mcleod et al. | 166/250.1 |
| 8,664,958 B2 | 3/2014 | Simon | 324/338 |
| 8,672,875 B2 | 3/2014 | Vanderveen et al. | 604/67 |
| 8,675,779 B2 | 3/2014 | Zeppetelle et al. | 375/340 |
| 8,683,859 B2 | 4/2014 | Godager | 73/152.54 |
| 8,689,621 B2 | 4/2014 | Godager | 73/152.54 |
| 8,701,480 B2 | 4/2014 | Eriksen | 73/152.51 |
| 8,750,789 B2 | 6/2014 | Baldemair et al. | 455/11.1 |
| 8,787,840 B2 | 7/2014 | Srinivasan et al. | 455/69 |
| 8,805,632 B2 | 8/2014 | Coman et al. | 702/89 |
| 8,826,980 B2 | 9/2014 | Neer | 166/255.1 |
| 8,833,469 B2 | 9/2014 | Purkis | 166/373 |
| 8,893,784 B2 | 11/2014 | Abad | E21B 43/26 |
| 8,910,716 B2 | 12/2014 | Newton et al. | 166/373 |
| 8,994,550 B2 | 3/2015 | Millot et al. | E21B 47/16 |
| 8,995,837 B2 | 3/2015 | Mizuguchi et al. | H04B 10/27 |
| 9,062,508 B2 | 6/2015 | Huval et al. | E21B 47/122 |
| 9,062,531 B2 | 6/2015 | Jones | E21B 47/082 |
| 9,075,155 B2 | 7/2015 | Luscombe et al. | G01V 1/226 |
| 9,078,055 B2 | 7/2015 | Nguyen et al. | H04R 5/00 |
| 9,091,153 B2 | 7/2015 | Yang et al. | E21B 47/12 |
| 9,133,705 B2 | 9/2015 | Angeles Boza | E21B 47/12 |
| 9,140,097 B2 | 9/2015 | Themig et al. | E21B 34/12 |
| 9,144,894 B2 | 9/2015 | Barnett et al. | B25B 17/00 |
| 9,206,645 B2 | 12/2015 | Hallundbaek | E21B 7/04 |
| 9,279,301 B2 | 3/2016 | Lovorn et al. | E21B 21/103 |
| 9,284,819 B2 | 3/2016 | Tolman et al. | E21B 41/00 |
| 9,284,834 B2 | 3/2016 | Alteirac et al. | E21B 47/12 |
| 9,310,510 B2 | 4/2016 | Godager | G01V 3/38 |
| 9,333,350 B2 | 5/2016 | Rise et al. | A61N 1/36082 |
| 9,334,696 B2 | 5/2016 | Hay | E21B 47/12 |
| 9,359,841 B2 | 6/2016 | Hall | E21B 23/00 |
| 9,363,605 B2 | 6/2016 | Goodman et al. | H04R 17/00 |
| 9,376,908 B2 | 6/2016 | Ludwig et al. | E21B 47/01 |
| 9,441,470 B2 | 9/2016 | Guerrero et al. | E21B 43/14 |
| 9,515,748 B2 | 12/2016 | Jeong et al. | G10L 25/90 |
| 9,557,434 B2 | 1/2017 | Keller et al. | G01V 1/52 |
| 9,617,829 B2 | 4/2017 | Dale et al. | E21B 41/00 |
| 9,617,850 B2 | 4/2017 | Fripp et al. | E21B 47/18 |
| 9,631,485 B2 | 4/2017 | Keller et al. | E21B 47/16 |
| 9,657,564 B2 | 5/2017 | Stolpman | E21B 47/16 |
| 9,664,037 B2 | 5/2017 | Logan et al. | E21B 47/122 |
| 9,670,773 B2 | 6/2017 | Croux | E21B 47/16 |
| 9,683,434 B2 | 6/2017 | Machocki | E21B 44/00 |
| 9,686,021 B2 | 6/2017 | Merino | E21B 47/16 |
| 9,715,031 B2 | 7/2017 | Contant et al. | E21B 47/122 |
| 9,721,448 B2 | 8/2017 | Wu et al. | G08B 21/20 |
| 9,759,062 B2 | 9/2017 | Deffenbaugh et al. | E21B 47/16 |
| 9,816,373 B2 | 11/2017 | Howell et al. | E21B 47/16 |
| 9,822,634 B2 | 11/2017 | Gao | E21B 47/16 |
| 9,863,222 B2 | 1/2018 | Morrow et al. | E21B 43/122 |
| 9,879,525 B2 | 1/2018 | Morrow et al. | E21B 47/12 |
| 9,945,204 B2 | 4/2018 | Ross et al. | E21B 33/127 |
| 9,963,955 B2 | 5/2018 | Tolman et al. | E21B 43/119 |
| 10,100,635 B2 | 10/2018 | Keller et al. | E21B 47/18 |
| 10,103,846 B2 | 10/2018 | van Zelm et al. | E21B 47/12 |
| 10,132,149 B2 | 11/2018 | Morrow et al. | E21B 43/267 |
| 10,145,228 B2 | 12/2018 | Yarus et al. | E21B 44/00 |
| 10,167,716 B2 | 1/2019 | Clawson et al. | E21B 47/14 |
| 10,167,717 B2 | 1/2019 | Deffenbaugh et al. | E21B 47/16 |
| 10,190,410 B2 | 1/2019 | Clawson et al. | E21B 47/14 |
| 10,196,862 B2 | 2/2019 | Li-Leger et al. | E21B 17/02 |
| 2002/0180613 A1 | 12/2002 | Shi et al. | E21B 47/18 |
| 2003/0056953 A1 | 3/2003 | Tumlin et al. | 166/298 |
| 2003/0117896 A1 | 6/2003 | Sakuma et al. | 367/81 |
| 2004/0020063 A1 | 2/2004 | Lewis et al. | 33/313 |
| 2004/0200613 A1 | 10/2004 | Fripp et al. | 166/250.01 |
| 2004/0239521 A1 | 12/2004 | Zierolf | 340/854.1 |
| 2005/0269083 A1 | 12/2005 | Burris, II et al. | 166/255.2 |
| 2005/0284659 A1 | 12/2005 | Hall et al. | 175/27 |
| 2006/0033638 A1 | 2/2006 | Hall et al. | 340/854.6 |
| 2006/0041795 A1 | 2/2006 | Gabelmann et al. | 714/699 |
| 2006/0090893 A1 | 5/2006 | Sheffield | 166/250.15 |
| 2007/0139217 A1 | 6/2007 | Beique et al. | 340/856.3 |
| 2007/0146351 A1 | 6/2007 | Katsurahira et al. | 345/179 |
| 2007/0156359 A1 | 7/2007 | Varsamis et al. | 702/69 |
| 2007/0219758 A1 | 9/2007 | Bloomfield | 702/190 |
| 2007/0272411 A1 | 11/2007 | Lopez de Cardenas et al. | 166/305.1 |
| 2008/0030365 A1 | 2/2008 | Fripp et al. | E21B 47/16 |
| 2008/0110644 A1 | 5/2008 | Howell et al. | 166/387 |
| 2008/0185144 A1 | 8/2008 | Lovell | 166/250.17 |
| 2008/0304360 A1 | 12/2008 | Mozer | 367/117 |
| 2009/0003133 A1 | 1/2009 | Dalton et al. | 367/82 |
| 2009/0030614 A1 | 1/2009 | Carnegie et al. | 702/6 |
| 2009/0034368 A1 | 2/2009 | Johnson | 367/83 |
| 2009/0045974 A1 | 2/2009 | Patel | 340/854.6 |
| 2009/0080291 A1 | 3/2009 | Tubel et al. | 367/81 |
| 2009/0166031 A1 | 7/2009 | Hernandez | 166/250.01 |
| 2010/0013663 A1 | 1/2010 | Cavender et al. | 340/854.3 |
| 2010/0089141 A1 | 4/2010 | Rioufol et al. | 73/152.28 |
| 2010/0133004 A1 | 6/2010 | Burleson et al. | 175/2 |
| 2010/0182161 A1 | 7/2010 | Robbins et al. | 340/853.7 |
| 2010/0212891 A1 | 8/2010 | Stewart et al. | 166/250.12 |
| 2011/0061862 A1 | 3/2011 | Loretz et al. | 166/250.11 |
| 2011/0066378 A1 | 3/2011 | Lerche et al. | 702/6 |
| 2011/0168403 A1 | 7/2011 | Patel | 166/373 |
| 2011/0188345 A1 | 8/2011 | Wang | 367/34 |
| 2011/0297376 A1 | 12/2011 | Holderman et al. | 166/278 |
| 2011/0297673 A1 | 12/2011 | Zbat et al. | 219/756 |
| 2011/0301439 A1 | 12/2011 | Albert et al. | 600/301 |
| 2011/0315377 A1 | 12/2011 | Rioufol | 166/250.17 |
| 2012/0043079 A1 | 2/2012 | Wassouf et al. | 166/250 |
| 2012/0126992 A1 | 5/2012 | Rodney et al. | 340/850 |
| 2012/0152562 A1 | 6/2012 | Newton et al. | 166/369 |
| 2012/0179377 A1 | 7/2012 | Lie | 702/6 |
| 2013/0000981 A1 | 1/2013 | Grimmer et al. | 175/45 |
| 2013/0003503 A1 | 1/2013 | L'Her et al. | 367/106 |
| 2013/0106615 A1 | 5/2013 | Prammer | 340/854.6 |
| 2013/0138254 A1 | 5/2013 | Seals et al. | 700/282 |
| 2013/0192823 A1 | 8/2013 | Barrilleaux et al. | 166/250.01 |
| 2013/0278432 A1 | 10/2013 | Shashoua et al. | 340/853.7 |
| 2013/0319102 A1 | 12/2013 | Ringgenberg et al. | 73/152.28 |
| 2014/0060840 A1 | 3/2014 | Hartshorne et al. | 166/300 |
| 2014/0062715 A1 | 3/2014 | Clark | 340/853.2 |
| 2014/0102708 A1 | 4/2014 | Purkis et al. | 166/308.1 |
| 2014/0133276 A1 | 5/2014 | Volker et al. | 367/82 |
| 2014/0152659 A1 | 6/2014 | Davidson et al. | 345/420 |
| 2014/0153368 A1 | 6/2014 | Bar-Cohen et al. | 367/81 |
| 2014/0166266 A1 | 6/2014 | Read | 166/250.01 |
| 2014/0170025 A1 | 6/2014 | Weiner et al. | 422/82.01 |
| 2014/0266769 A1 | 9/2014 | van Zelm | 340/854.3 |
| 2014/0273831 A1* | 9/2014 | Walton | E21B 34/066 455/41.1 |
| 2014/0327552 A1 | 11/2014 | Filas et al. | 340/854.6 |
| 2014/0352955 A1 | 12/2014 | Tubel et al. | 166/250.15 |
| 2015/0003202 A1 | 1/2015 | Palmer et al. | 367/82 |
| 2015/0009040 A1 | 1/2015 | Bowles et al. | 340/854.6 |
| 2015/0027687 A1 | 1/2015 | Tubel | 166/72 |
| 2015/0041124 A1 | 2/2015 | Rodriguez | 166/255.1 |
| 2015/0041137 A1 | 2/2015 | Rodriguez | 166/301 |
| 2015/0152727 A1 | 6/2015 | Fripp et al. | E21B 47/14 |
| 2015/0159481 A1 | 6/2015 | Mebarkia et al. | E21B 47/065 |
| 2015/0167425 A1 | 6/2015 | Hammer et al. | E21B 34/06 |
| 2015/0176370 A1 | 6/2015 | Greening et al. | E21B 41/00 |
| 2015/0292319 A1 | 10/2015 | Disko et al. | E21B 47/16 |
| 2015/0292320 A1 | 10/2015 | Lynk et al. | E21B 47/16 |
| 2015/0300159 A1 | 10/2015 | Stiles et al. | E21B 47/16 |
| 2015/0330200 A1 | 11/2015 | Richard et al. | E21B 44/00 |
| 2015/0337642 A1 | 11/2015 | Spacek | E21B 44/005 |
| 2015/0354351 A1 | 12/2015 | Morrow et al. | E21B 47/16 |
| 2015/0377016 A1 | 12/2015 | Ahmad | E21B 47/122 |
| 2016/0010446 A1 | 1/2016 | Logan et al. | E21B 47/122 |
| 2016/0047230 A1 | 2/2016 | Livescu et al. | E21B 47/10 |
| 2016/0047233 A1 | 2/2016 | Butner et al. | E21B 47/12 |
| 2016/0076363 A1 | 3/2016 | Morrow et al. | E21B 47/12 |
| 2016/0109606 A1 | 4/2016 | Market et al. | G01V 1/50 |
| 2016/0215612 A1 | 7/2016 | Morrow | E21B 47/122 |

(56) References Cited

U.S. PATENT DOCUMENTS

| | | | |
|---|---|---|---|
| 2017/0138185 A1 | 5/2017 | Saed et al. | E21B 47/16 |
| 2017/0145811 A1 | 5/2017 | Robison et al. | E21B 47/0007 |
| 2017/0152741 A1 | 6/2017 | Park et al. | E21B 47/123 |
| 2017/0167249 A1 | 6/2017 | Lee et al. | E21B 47/14 |
| 2017/0204719 A1 | 7/2017 | Babakhani | E21B 47/0005 |
| 2017/0254183 A1 | 9/2017 | Vasques et al. | E21B 47/16 |
| 2017/0293044 A1 | 10/2017 | Gilstrap et al. | G01V 1/50 |
| 2017/0314386 A1 | 11/2017 | Orban et al. | E21B 47/091 |
| 2018/0010449 A1 | 1/2018 | Roberson et al. | E21B 47/16 |
| 2018/0058191 A1 | 3/2018 | Romer et al. | E21B 47/0007 |
| 2018/0058198 A1 | 3/2018 | Ertas et al. | E21B 47/12 |
| 2018/0058202 A1 | 3/2018 | Disko et al. | E21B 47/14 |
| 2018/0058203 A1 | 3/2018 | Clawson et al. | E21B 47/14 |
| 2018/0058204 A1 | 3/2018 | Clawson et al. | E21B 47/14 |
| 2018/0058205 A1 | 3/2018 | Clawson et al. | E21B 47/14 |
| 2018/0058206 A1 | 3/2018 | Zhang et al. | E21B 47/16 |
| 2018/0058207 A1 | 3/2018 | Song et al. | E21B 47/16 |
| 2018/0058208 A1 | 3/2018 | Song et al. | E21B 47/16 |
| 2018/0058209 A1 | 3/2018 | Song et al. | E21B 47/16 |
| 2018/0066490 A1 | 3/2018 | Kjos | E21B 33/035 |
| 2018/0066510 A1 | 3/2018 | Walker et al. | E21B 47/011 |

FOREIGN PATENT DOCUMENTS

| | | | |
|---|---|---|---|
| EP | 1409839 | 4/2005 | E21B 43/1185 |
| EP | 2677698 | 12/2013 | H04L 12/28 |
| WO | WO2002/027139 | 4/2002 | E21B 43/12 |
| WO | WO2010/074766 | 7/2010 | A41C 1/14 |
| WO | WO2013/079928 | 6/2013 | E21B 47/12 |
| WO | WO2014/018010 | 1/2014 | E21B 47/12 |
| WO | WO2014/049360 | 4/2014 | E21B 47/12 |
| WO | WO2014/100271 | 6/2014 | E21B 47/12 |
| WO | WO2014/134741 | 9/2014 | E21B 47/13 |
| WO | WO2015/117060 | 8/2015 | E21B 47/12 |

OTHER PUBLICATIONS

U.S. Appl. No. 16/139,373, filed Sep. 24, 2018, Yi, Xiaohua et al.
U.S. Appl. No. 16/139,384, filed Oct. 13, 2017, Disko, Mark M. et al.
U.S. Appl. No. 16/139,394, filed Oct. 13, 2017, Song, Limin et al.
U.S. Appl. No. 16/139,403, filed Oct. 13, 2017, Song, Limin et al.
U.S. Appl. No. 16/139,414, filed Oct. 13, 2017, Zhang, Yibing et al.
U.S. Appl. No. 16/139,421, filed Oct. 13, 2017, Song, Limin et al.
U.S. Appl. No. 16/139,427, filed Oct. 13, 2017, Disko, Mark M. et al.
U.S. Appl. No. 16/175,418, filed Oct. 30, 2018, Kent, David K. et al.
U.S. Appl. No. 62/588,067, filed Nov. 17, 2017, Song, Limin et al.
U.S. Appl. No. 62/588,080, filed Nov. 17, 2017, Kinn, Timothy F. et al.
U.S. Appl. No. 62/588,103, filed Nov. 17, 2017, Yi, Xiaohua et al.
Arroyo, Javier et al. (2009) "Forecasting Histogram Time Series with K-Nearest Neighbours Methods," *International Journal of Forecasting*, v.25, pp. 192-207.
Arroyo, Javier et al. (2011) "Smoothing Methods for Histogram-Valued Time Seriers: An Application to Value-at-Risk," *Univ. of California, Dept. of Economics*, www.wileyonlinelibrary.com, Mar. 8, 2011, 28 pages.
Arroyo, Javier et al. (2011) "Forecasting with Interval and Histogram Data Some Financial Applications," *Univ. of California, Dept. of Economics*, 46 pages.
Emerson Process Management (2011), "Roxar downhole Wireless PT sensor system," www.roxar.com, or downhole@roxar.com, 2 pgs.
Gonzalez-Rivera, Gloria et al. (2012) "Time Series Modeling of Histogram-Valued Data: The Daily Histogram Time Series of S&P500 Intradaily Returns," *International Journal of Forecasting*, v.28, 36 pgs.
Gutierrez-Estevez, M. A. et al. (2013) "Acoustic Boardband Communications Over Deep Drill Strings using Adaptive OFDM", *IEEE Wireless Comm. & Networking Conf.*, pp. 4089-4094.
Qu, X. et al. (2011) "Reconstruction fo Self-Sparse 20 NMR Spectra From undersampled Data in The Indirect Dimension", pp. 8888-8909.
U.S. Department of Defense (1999) "Interoperability and Performance Standards for Medium and High Frequency Radio Systems," MIL-STD-188-141B, Mar. 1, 1999, 584 pages.
U.S. Appl. No. 62/588,054, filed Nov. 17, 2017, Song, Limin et al.
U.S. Appl. No. 16/139,384, filed Sep. 24, 2018, Disko, Mark M. et al.
U.S. Appl. No. 16/139,394, filed Sep. 24, 2018, Song, Limin et al.
U.S. Appl. No. 16/139,414, filed Sep. 24, 2018, Zhang, Yibing et al.
U.S. Appl. No. 16/139,421, filed Sep. 24, 2018, Song, Limin et al.
U.S. Appl. No. 16/139,427, filed Sep. 24, 2018, Disko, Mark M. et al.

\* cited by examiner

METHOD AND SYSTEM FOR PERFORMING OPERATIONS USING COMMUNICATIONS FOR A HYDROCARBON SYSTEM

CROSS REFERENCE TO RELATED APPLICATION

This application claims the benefit of U.S. Provisional Application Ser. No. 62/588,067, filed Nov. 17, 2017 entitled "Method and System for Performing Operations using Communications for a Hydrocarbon System," the disclosure of which is incorporated herein by reference in its entirety.

This application is related to U.S. Patent Publication No. 2018/0058207, published Mar. 1, 2018 entitled "Dual Transducer Communications Node for Downhole Acoustic Wireless Networks and Method Employing Same;" U.S. Publication No. 2018/0058206, published Mar. 1, 2018 entitled "Communication Networks, Relay Nodes for Communication Networks, and Methods of Transmitting Data Among a Plurality of Relay Nodes;" U.S. Publication No. 2018/0058208, published Mar. 1, 2018 entitled "Hybrid Downhole Acoustic Wireless Network;" U.S. Publication No. 2018/0058203, published Mar. 1, 2018 entitled "Methods of Acoustically Communicating and Wells that Utilize the Methods;" U.S. Publication No. 2018/0058209, published Mar. 1, 2018 entitled "Downhole Multiphase Flow Sensing Methods;" U.S. Publication No. 2018/0066510, published Mar. 8, 2018 entitled "Acoustic Housing for Tubulars;" the disclosures of which are incorporated herein by reference in their entireties.

This application is related to U.S. Applications having common inventors and assignee: U.S. patent application Ser. No. 16/139,414, filed Sep. 24, 2018 entitled "Method and System for Performing Operations using Communications;" U.S. patent application Ser. No. 16/139,394, filed Sep. 24, 2018 entitled "Method and System for Performing Communications using Aliasing;" U.S. patent application Ser. No. 16/139,427, filed Sep. 24, 2018 entitled "Method and System for Performing Operations with Communications;" U.S. patent application Ser. No. 16/139,421, filed Sep. 24, 2018 entitled "Method and System for Performing Wireless Ultrasonic Communications Along a Drilling String;" U.S. patent application Ser. No. 16/139,384, filed Sep. 24, 2018 entitled "Method and System for Performing Hydrocarbon Operations with Mixed Communication Networks;" U.S. Provisional Application No. 62/588,054, filed Nov. 17, 2017 entitled "Method and System for Performing Communications During Cementing Operations;" U.S. patent application Ser. No. 16/139,373, filed Sep. 24, 2018 entitled "Vertical Seismic Profiling;" U.S. Provisional Application No. 62/588,080, filed Nov. 17, 2017 entitled "Method and System for Performing Wireless Ultrasonic Communications Along Tubulars Members;" U.S. Provisional Application No. 62/588,103, filed Nov. 17, 2017 entitled "Method and System for Performing Hydrocarbon Operations using Communications Associated with Completions;" the disclosures of which are incorporated herein by reference in their entireties.

FIELD OF THE INVENTION

This disclosure relates generally to the field of performing operations, such as hydrocarbon exploration, hydrocarbon development, and hydrocarbon production and, more particularly, to communicating and obtaining measurement data. Specifically, the disclosure relates to methods and systems for communicating with communication nodes, which may be disposed along one or more tubular members, such as along casing or tubing within a wellbore, along a subsea conduit and/or along a pipeline, to enhance associated operations, such as hydrocarbon exploration, hydrocarbon development, and/or hydrocarbon production.

BACKGROUND

This section is intended to introduce various aspects of the art, which may be associated with exemplary embodiments of the present disclosure. This discussion is believed to assist in providing a framework to facilitate a better understanding of particular aspects of the present invention. Accordingly, it should be understood that this section should be read in this light, and not necessarily as admissions of prior art.

In hydrocarbon exploration, hydrocarbon development, and/or hydrocarbon production operations, several real time data systems or methods have been proposed. As a first example, a physical connection, such as a cable, an electrical conductor or a fiber optic cable, is secured to a tubular member, which may be used to evaluate conditions, such as subsurface conditions or downhole conditions. The cable may be secured to an inner portion of the tubular member or an outer portion of the tubular member. The cable provides a hard wire connection to provide real-time transmission of data. Further, the cables may be used to provide high data transmission rates and the delivery of electrical power directly to downhole sensors. However, use of physical cables may be difficult as the cables have to be unspooled and attached to the tubular member sections disposed within a wellbore. Accordingly, the conduits being installed into the well may not be rotated because of the attached cables, which may be broken through such installations. This limitation may be problematic for installations into horizontal wells, which typically involve rotating the tubular members. These passages for the cables provide potential locations for leakage of fluids, which may be more problematic for configurations that involve high pressures fluids. In addition, the leakage of down-hole fluids may increase the risk of cement seal failures.

In contrast to physical connection configurations, various wireless technologies may be used for downhole communications. Such technologies are referred to as telemetry. These communication nodes communicate with each other to manage the exchange of data within the wellbore and with a computer system that is utilized to manage the hydrocarbon operations. The communication nodes may involve different wireless network types. As a first example, radio transmissions may be used for wellbore communications. However, the use of radio transmissions may be impractical or unavailable in certain environments or during certain operations. Acoustic telemetry utilizes an acoustic wireless network to wirelessly transmit an acoustic signal, such as a vibration, via a tone transmission medium. In general, a given tone transmission medium may only permit communication within a certain frequency range; and, in some systems, this frequency range may be relatively small. Such systems may be referred to herein as spectrum-constrained systems. An example of a spectrum-constrained system is a well, such as a hydrocarbon well, that includes a plurality of communication nodes spaced-apart along a length thereof.

While the downhole wireless network may be beneficial, conventional data transmission mechanisms may not be effectively utilized. The conditions within the wellbore are unknown and unpredictable, as the downhole acoustic conditions may be defined by formation, cementation, and/or fluid compositions (e.g., gas, water and oil), which vary at different locations within the wellbore. For example, the selection of the appropriate frequencies of the acoustic signals are necessary to support the predefined communication (e.g., long range communication) with minimum power consumption. In addition, the communications may be further complicated because of changes that result from hydrocarbon operations (e.g., following fracking operations). Further, conventional approaches have been involve intrusive sensing methods for flow measurement, such as differential pressure sensing of flow-restrictive devices (e.g., restriction orifice, pitot tube), internal rotating devices (e.g., turbines), and radioactive methods for material identification.

Accordingly, there remains a need in the industry for methods and systems that are more efficient and may lessen problems associated with noisy and ineffective communication. Further, a need remains for efficient approaches to perform acoustic communications along tubular members, which may be within a wellbore. The present techniques provide methods and systems that overcome one or more of the deficiencies discussed above.

SUMMARY

In one embodiment, a method of communicating data among a plurality of communication nodes in a communication network is described. The method comprising: obtaining field data for a hydrocarbon system; creating a communication network configuration based on the obtained field data for a communication network, wherein the communication network includes a plurality of communication nodes; configuring the plurality of communication nodes based on the communication network configuration; configuring a control unit based on the communication network configuration and configured to exchange data packets with the plurality of communication nodes; installing the communication nodes in the hydrocarbon system; and exchanging data packets to between the plurality of communication nodes and the control unit to perform hydrocarbon operations for the hydrocarbon system.

In other embodiments, one or more enhancements are described. The method may further comprising identifying one or more parameters to be measured for the hydrocarbon system; wherein one or more of the plurality of the communication nodes are configured to detect the one or more parameters; further comprising: obtaining measurements from one or more of the plurality of communication nodes, wherein the plurality of communication nodes are disposed along one or more tubular members, transmitting the obtained measurement from the one or more of the plurality of communication nodes to the control unit, and performing hydrocarbon operations based on the obtained measurements; wherein each of the one or more of the plurality of communication nodes is configured to detect one of water breakthrough, gas breakthrough and any combination thereof; wherein each of the one or more of the plurality of communication nodes is configured to measure one of detect pressure, temperature, resistivity, capacitance, pH, and any combination thereof; wherein each of the one or more of the plurality of communication nodes is configured to detect changes in fluid flow through one of the tubular members; wherein each of the one or more of the plurality of communication nodes is configured to measure one of pressure, acoustics, strain, capacitance, resistivity and any combination thereof; wherein installing the communication nodes in the hydrocarbon system comprises: disposing a first set of communication nodes from the plurality of communication nodes into a first well, disposing a first topside communication node from the plurality of communication nodes to a first tree associated with the first well, disposing a second set of communication nodes from the plurality of communication nodes into a second well, and disposing a second topside communication node from the plurality of communication nodes to a second tree associated with the second well; wherein the first topside communication node is configured to measure fluid flow from the first well; and/or wherein the second topside communication node is configured to measure fluid flow from the second well; wherein the first topside communication node is configured to measure fluid composition from the first well; and/or wherein the second topside communication node is configured to measure fluid composition from the second well; wherein one of the communication nodes in the first well is configured to measure fluid flow within the first well; and/or wherein one of the communication node in the second node is configured to measure fluid flow within the second well; wherein one of the communication nodes in the first well is configured to measure fluid composition within the first well; and/or wherein one of the communication nodes in the second well is configured to measure fluid composition from the second well; wherein one of the communication nodes in the first well is configured to measure temperature within the first well; and/or wherein one of the communication node in the second node is configured to measure temperature within the second well; wherein one of the communication nodes in the first well is configured to measure pressure within the first well; and/or wherein one of the communication nodes in the second well is configured to measure pressure from the second well; wherein the first topside communication node and the second topside communication node are each configured to communicate via one of radio frequencies, physical connections and any combination thereof and the communication nodes with the first well and second well are configured to communicate via acoustically; further comprising: configuring one or more gateway nodes based on the communication network configuration, wherein at least one of the one or more gateway nodes is configured to exchange data packets between the first topside communication node and the control unit based on the communication network configuration and to exchange data packets between the second topside communication node and the control unit based on the communication network configuration, installing the one or more gateway nodes in the hydrocarbon system, and exchanging data packets to between the first topside communication node and control unit via the at least one of the one or more gateway nodes and between the second topside communication node and control unit via the at least one of the one or more gateway nodes; wherein the creation of the communication network comprises selecting one of one or more frequency bands, one or more individual tones, one or more coding methods, and any combination thereof; wherein the communicating between the plurality of communication nodes comprises exchanging low-frequency signals that are less than or equal to ($\leq$) 20 kilohertz; wherein the communicating between the plurality of communication nodes comprises exchanging low-frequency signals that are in the range between 100 hertz and 20 kilohertz; wherein the communicating between the plurality of communication nodes comprises exchanging high-frequency signals that are greater than (>) 20 kilohertz; wherein the communicating between the plurality of communication nodes comprises exchanging high-frequency signals that are in the range between greater than 20 kilohertz and 1 megahertz; further comprising determining whether to adjust hydrocarbon operations based on the exchanged data packets to between the plurality of communication nodes and the control unit; further comprising performing the adjustment to hydrocarbon operations based on the determination; wherein the field data is associated with equipment installed within the wellbores and associated wellbore equipment; and/or further comprising modeling fluid compositions in the hydrocarbon system based on the data packets.

A hydrocarbon system is described. The system comprising: a plurality of wellbores in a hydrocarbon system; a plurality of tubular members disposed in the plurality of wellbores; a communication network associated with the hydrocarbon system, wherein the communication network comprises a plurality of communication nodes, a plurality of topside nodes and one or more gateway nodes that are configured to communicate operational data between two or more of the plurality of communication nodes during hydrocarbon operations, plurality of topside nodes and one or more gateway nodes.

BRIEF DESCRIPTION OF THE DRAWINGS

The advantages of the present invention are better understood by referring to the following detailed description and the attached drawings.

DETAILED DESCRIPTION

Figure 1:
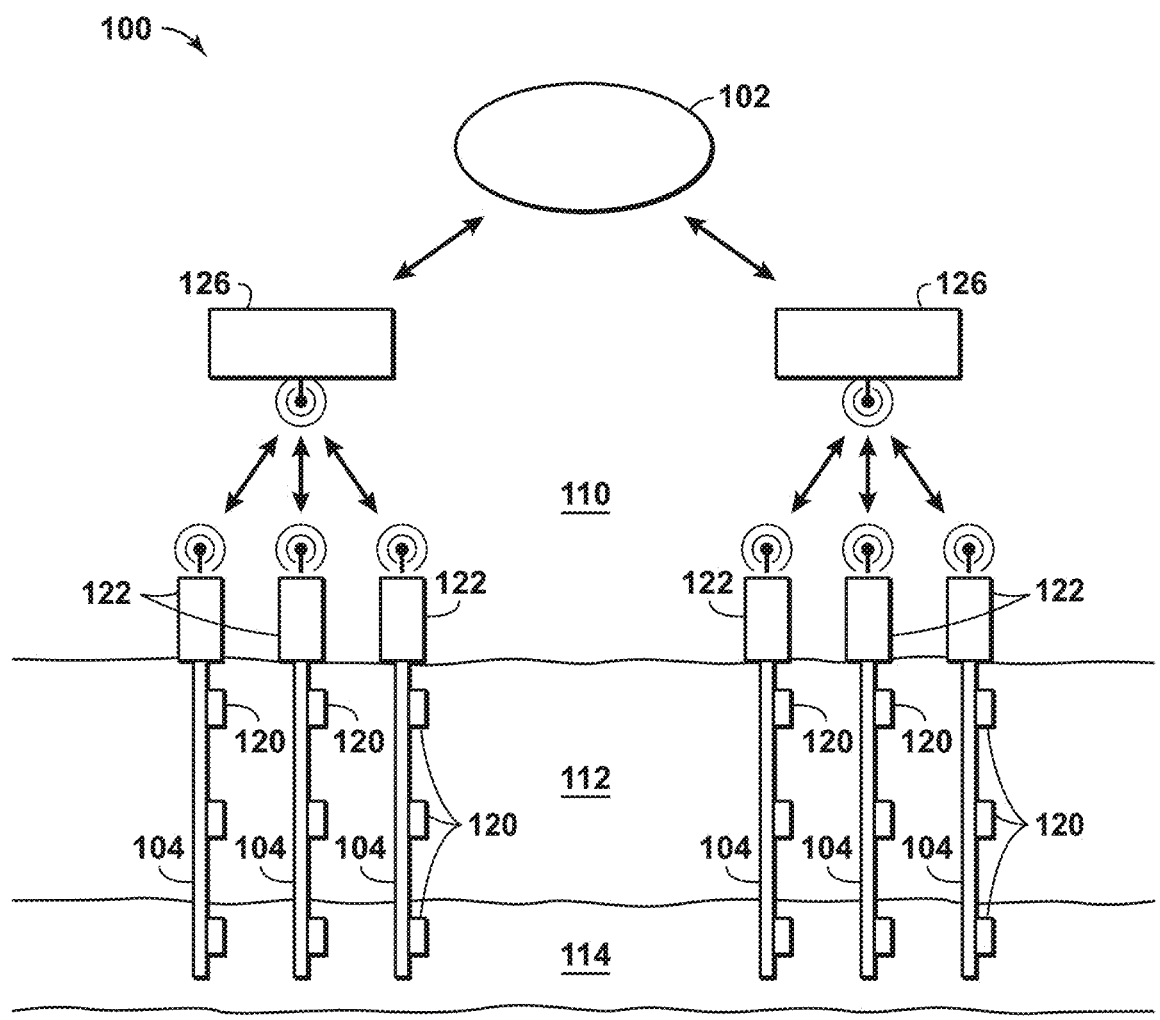
FIG. 1 is an exemplary schematic representation of a hydrocarbon system configured to utilize the methods according to the present disclosure.

In the following detailed description section, the specific embodiments of the present disclosure are described in connection with preferred embodiments. However, to the extent that the following description is specific to a particular embodiment or a particular use of the present disclosure, this is intended to be for exemplary purposes only and simply provides a description of the exemplary embodiments. Accordingly, the disclosure is not limited to the specific embodiments described below, but rather, it includes all alternatives, modifications, and equivalents falling within the true spirit and scope of the appended claims.

Various terms as used herein are defined below. To the extent a term used in a claim is not defined below, it should be given the broadest definition persons in the pertinent art have given that term as reflected in at least one printed publication or issued patent.

The articles "the", "a", and "an" are not necessarily limited to mean only one, but rather are inclusive and open ended so as to include, optionally, multiple such elements.

The directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore. Continuing with the example of relative directions in a wellbore, "upper" and "lower" may also refer to relative positions along the longitudinal dimension of a wellbore rather than relative to the surface, such as in describing both vertical and horizontal wells.

As used herein, the term "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer to, in one embodiment, to A only (optionally including elements other than B); in another embodiment, to B only (optionally including elements other than A); in yet another embodiment, to both A and B (optionally including other elements). As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of".

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

As used herein, "any" means one, some, or all indiscriminately of whatever quantity.

As used herein, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements). The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

As used herein, "based on" does not mean "based only on", unless expressly specified otherwise. In other words, the phrase "based on" describes both "based only on," "based at least on," and "based at least in part on."

As used herein, "clock tick" refers to a fundamental unit of time in a digital processor. For example, one clock tick equals the inverse of the effective clock speed that governs operation of the processor. Specifically, one clock tick for a 1 MHz effective clock speed is equal to one microsecond. As another example, one clock tick may be equivalent to the minimum amount of time involved for a scalar processor to execute one instruction. A processor may operate at various effective clock speeds, and, as such, the amount of time equivalent to one clock tick may vary, but a fractional clock tick is not possible.

As used herein, "conduit" refers to a tubular member forming a physical channel through which something is conveyed. The conduit may include one or more of a pipe, a manifold, a tube or the like, or the liquid contained in the tubular member. Alternately, conduit refers to an acoustic channel of liquid which may, for example, exist between the formation and a tubular.

As used herein, "couple" refers to an interaction between elements and is not meant to limit the interaction to direct interaction between the elements and may also include indirect interaction between the elements described. Couple may include other terms, such as "connect", "engage", "attach", or any other suitable terms.

As used herein, "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, "one embodiment," "an embodiment," "some embodiments," "one aspect," "an aspect," "some aspects," "some implementations," "one implementation," "an implementation," or similar construction means that a particular component, feature, structure, method, or characteristic described in connection with the embodiment, aspect, or implementation is included in at least one embodiment and/or implementation of the claimed subject matter. Thus, the appearance of the phrases "in one embodiment" or "in an embodiment" or "in some embodiments" (or "aspects" or "implementations") in various places throughout the specification are not necessarily all referring to the same embodiment and/or implementation. Furthermore, the particular features, structures, methods, or characteristics may be combined in any suitable manner in one or more embodiments or implementations.

As used herein, "event" is used herein to mean a detection of a change in a communication environment along the conduit, such as a tubular member and/or any associated liquid. The event may include a change within a wellbore, a detection of a local failure in communication, a failure to operate properly, a manual trigger, and/or a lapse of a time period.

As used herein, "exemplary" is used exclusively herein to mean "serving as an example, instance, or illustration." Any embodiment described herein as "exemplary" is not necessarily to be construed as preferred or advantageous over other embodiments.

As used herein, "formation" refers to any definable subsurface region. The formation may contain one or more hydrocarbon-containing layers, one or more non-hydrocarbon containing layers, an overburden, and/or an underburden of any geologic formation.

As used herein, "hydrocarbons" are generally defined as molecules formed primarily of carbon and hydrogen atoms such as oil and natural gas. Hydrocarbons may also include other elements or compounds, such as, but not limited to, halogens, metallic elements, nitrogen, oxygen, sulfur, hydrogen sulfide ($H_2S$), and carbon dioxide ($CO_2$). Hydrocarbons may be produced from hydrocarbon reservoirs through wells penetrating a hydrocarbon containing formation. Hydrocarbons derived from a hydrocarbon reservoir may include, but are not limited to, petroleum, kerogen, bitumen, pyrobitumen, asphaltenes, tars, oils, natural gas, or combinations thereof. Hydrocarbons may be located within or adjacent to mineral matrices within the earth, termed reservoirs. Matrices may include, but are not limited to, sedimentary rock, sands, silicilytes, carbonates, diatomites, and other porous media.

As used herein, "hydrocarbon exploration" refers to any activity associated with determining the location of hydrocarbons in subsurface regions. Hydrocarbon exploration normally refers to any activity conducted to obtain measurements through acquisition of measured data associated with the subsurface formation and the associated modeling of the data to identify potential locations of hydrocarbon accumulations. Accordingly, hydrocarbon exploration includes acquiring measurement data, modeling of the measurement data to form subsurface models, and determining the likely locations for hydrocarbon reservoirs within the subsurface. The measurement data may include seismic data, gravity data, magnetic data, electromagnetic data, and the like. The hydrocarbon exploration activities may include drilling exploratory wells.

As used herein, "hydrocarbon development" refers to any activity associated with planning of extraction and/or access to hydrocarbons in subsurface regions. Hydrocarbon development normally refers to any activity conducted to plan for access to and/or for production of hydrocarbons from the subsurface formation and the associated modeling of the data to identify preferred development approaches and methods. By way of example, hydrocarbon development may include modeling of the subsurface formation and extraction planning for periods of production, determining and planning equipment to be utilized and techniques to be utilized in extracting the hydrocarbons from the subsurface formation, and the like.

As used herein, "hydrocarbon fluids" refers to a hydrocarbon or mixtures of hydrocarbons that are gases or liquids. For example, hydrocarbon fluids may include a hydrocarbon or mixtures of hydrocarbons that are gases or liquids at formation conditions, at processing conditions, or at ambient conditions (20° Celsius (C) and 1 atmospheric (atm) pressure). Hydrocarbon fluids may include, for example, oil, natural gas, gas condensates, coal bed methane, shale oil, shale gas, and other hydrocarbons that are in a gaseous or liquid state.

As used herein, "hydrocarbon operations" refers to any activity associated with hydrocarbon exploration, hydrocarbon development, collection of wellbore data, and/or hydrocarbon production. It may also include the midstream pipelines and storage tanks, or the downstream refinery and distribution operations. By way of example, the hydrocarbon operations may include managing the communications for the wellbore through the communication nodes by utilizing the tubular members, such as drilling string and/or casing.

As used herein, "hydrocarbon production" refers to any activity associated with extracting hydrocarbons from subsurface location, such as a well or other opening. Hydrocarbon production normally refers to any activity conducted to form the wellbore along with any activity in or on the well after the well is completed. Accordingly, hydrocarbon production or extraction includes not only primary hydrocarbon extraction, but also secondary and tertiary production techniques, such as injection of gas or liquid for increasing drive pressure, mobilizing the hydrocarbon or treating by, for example, chemicals, hydraulic fracturing the wellbore to promote increased flow, well servicing, well logging, and other well and wellbore treatments.

As used herein, "mode" refers to a setting or configuration associated with the operation of communication nodes in a communication network. For example, the mode may include a setting for acoustical compression wave, acoustical shear wave, or any combination thereof.

As used herein, "monitored section" and "monitored sections" refer to locations along the tubular members that include sensors and/or are regions of interest.

As used herein, "unmonitored section" and "unmonitored sections" refer to locations along the tubular members that do not include sensors and/or are not regions of interest.

As used herein, "operatively connected" and/or "operatively coupled" means directly or indirectly connected for transmitting or conducting information, force, energy, or matter.

As used herein, "optimal", "optimizing", "optimize", "optimality", "optimization" (as well as derivatives and other forms of those terms and linguistically related words and phrases), as used herein, are not intended to be limiting in the sense of requiring the present invention to find the best solution or to make the best decision. Although a mathematically optimal solution may in fact arrive at the best of all mathematically available possibilities, real-world embodiments of optimization routines, methods, models, and processes may work towards such a goal without ever actually achieving perfection. Accordingly, one of ordinary skill in the art having benefit of the present disclosure will appreciate that these terms, in the context of the scope of the present invention, are more general. The terms may describe one or more of: 1) working towards a solution which may be the best available solution, a preferred solution, or a solution that offers a specific benefit within a range of constraints; 2) continually improving; 3) refining; 4) searching for a high point or a maximum for an objective; 5) processing to reduce a penalty function; 6) seeking to maximize one or more factors in light of competing and/or cooperative interests in maximizing, minimizing, or otherwise controlling one or more other factors, etc.

As used herein, "potting" refers to the encapsulation of electrical components with epoxy, elastomeric, silicone, or asphaltic or similar compounds for the purpose of excluding moisture or vapors. Potted components may or may not be hermetically sealed.

As used herein, "range" or "ranges", such as concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a range of about 1 to about 200 should be interpreted to include not only the explicitly recited limits of 1 and about 200, but also to include individual sizes such as 2, 3, 4, etc. and sub-ranges such as 10 to 50, 20 to 100, etc. Similarly, it should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

As used herein, "sealing material" refers to any material that can seal a cover of a housing to a body of a housing sufficient to withstand one or more downhole conditions including but not limited to, for example, temperature, humidity, soil composition, corrosive elements, pH, and pressure.

As used herein, "sensor" includes any electrical sensing device or gauge. The sensor may be capable of monitoring or detecting pressure, temperature, fluid flow, vibration, resistivity, or other formation data. Alternatively, the sensor may be a position sensor.

As used herein, "stream" refers to fluid (e.g., solids, liquid and/or gas) being conducted through various regions, such as equipment and/or a formation. The equipment may include conduits, vessels, manifolds, units or other suitable devices.

As used herein, "subsurface" refers to geologic strata occurring below the earth's surface.

As used herein, "telemetry diagnostic data", "diagnostic telemetry data", or "telemetry data" refer to data associated with the communication nodes exchanging information. The telemetry data may be exchanged for the purpose of assessing and proving or otherwise optimizing the communication. By example, this may include frequency and/or amplitude information.

As used herein, "physical layer" refers to the lowest layer of the Open Systems Interconnection model (OSI model) maintained by the identification ISO/IEC 7498-1. The OSI model is a conceptual model that partitions a communication system into abstraction layers. The physical layer defines basic electrical and physical specifications of the network such as acoustic frequency band, radio-frequency (RF) frequency band, acoustic versus electromagnetic communication, and other electrical and physical aspects of the communication.

As used herein, "direct mapping" refers to establishing a correspondence between communication frequencies and symbolic information such that particular communication frequencies represent a particular piece of symbolic information. Examples of symbolic information include, but are not limited to, the letters in alphabet or specific arrangements of bits in a computer memory. By way of example, direct mapping in an acoustic telemetry system may include each 100 kHz tone representing the letter "A", each 102 kHz tone representing the letter "B", each 104 kHz tone representing the letter "C", and so on. By contrast, "spread spectrum" may involve a correspondence between communication frequencies and symbolic information that changes repeatedly and in rapid fashion, such that, by way of example, a 100 kHz tone may represent the letter "A" and a 104 kHz tone may represent the letter "B" and a 102 kHz tone may represent the letter "C", then a 110 kHz tone may represent the letter "A" and a 112 kHz tone may represent the letter "B" and a 114 kHz tone may represent the letter "C", then a 90 kHz tone may represent the letter "A" and a 84 kHz tone may represent the letter "B" and a 96 kHz tone may represent the letter "C", and so on. In addition, the direct mapping may not change, while spread spectrum may change.

As used herein, "frequency combining" refers to aggregating similar frequencies by dividing the range of possible frequencies into a number of sections and classifying all frequencies within any one section as occurrences of a single frequency. It will be apparent to a person skilled in the computational arts that the totality of possible frequencies may be excessively large, leading to an excessive degree of computational complexity inherent in analysis of the frequencies, and that frequency combining can limit the number of possibilities to reduce the computational complexity inherent in analysis of the possibilities to an acceptable level. The limited number of possibilities resulting from frequency combining may be referred to as the "combined frequencies". The cadence of digital clock ticks acts as an upper bound on the number of possible combined frequencies in all cases.

As used herein, "signal strength" refers to a quantitative assessment of the suitability of a characteristic for a particular purpose. A characteristic may be an amplitude, a Fast Fourier Transform (FFT) magnitude, a signal-to-noise ratio (SNR), a zero crossing (ZCX) quality, a histogram quantity, an occurrence count, a margin or proportion above a baseline, or any other suitable measurement or calculation. By way of example, a histogram representing ZCX occurrence counts by period may assess ZCX signal strength for each period by dividing the occurrence count for each period by the maximum occurrence count in the histogram such that the ZCX signal strength for the period having the maximum occurrence count is 1 and this is the highest ZCX signal strength among all the periods in the histogram.

As used herein, "tubular member", "tubular section" or "tubular body" refer to any pipe, such as a joint of casing, a portion of a liner, a drill string, a production tubing, an injection tubing, a pup joint, a buried pipeline, underwater piping, or above-ground piping. Solid lines therein, and any suitable number of such structures and/or features may be omitted from a given embodiment without departing from the scope of the present disclosure.

As used herein, "wellbore" or "downhole" refers to a hole in the subsurface made by drilling or insertion of a conduit into the subsurface. A wellbore may have a substantially circular cross section, or other cross-sectional shape. As used herein, the term "well," when referring to an opening in the formation, may be used interchangeably with the term "wellbore."

As used herein, "well data" or "field data" may include seismic data, electromagnetic data, resistivity data, gravity data, well log data, core sample data, and combinations thereof. The field data may be obtained from memory or from the equipment in various wellbores and associated production equipment. The well data may also include the data associated with the equipment installed within the wellbore and the configuration of the wellbore equipment. For example, the well data may include the composition of the tubular members, thickness of the tubular members, length of the tubular members, fluid composition within the wellbore, formation properties, cementation within the wellbore and/or other suitable properties associated with the wellbore.

As used herein, "zone", "region", "container", or "compartment" is a defined space, area, or volume contained in the framework or model, which may be bounded by one or more objects or a polygon encompassing an area or volume of interest. The volume may include similar properties.

The exchange of information may be used to manage the operations for different technologies. By way of example, the communication network may include communication nodes disposed along one or more tubular members. The communication nodes may be distributed along casing or tubing within a wellbore, along a subsea conduit and/or along a pipeline, to enhance associated operations. Further, the communication nodes may communicate for various wellbores, subsea conduits and/or pipelines. To exchange information, the communication network may include physically connected communication nodes, wirelessly connected communication nodes or a combination of physically connected communication nodes and wirelessly connected communication nodes.

By way of example, the communication network may be used for data exchanges of operational data, which may be used for real-time or concurrent operations involving hydrocarbon exploration operations, hydrocarbon development operations, and/or hydrocarbon production operations, for example. In hydrocarbon operations, the system or method may involve communicating via a downhole network including various communication nodes spaced-apart along a length of tubular members, which may be a tone transmission medium (e.g., conduits). The communication nodes may communicate with each other to manage the exchange of data within the wellbore and with a computer system that is utilized to manage the hydrocarbon operations. Further, the communication network may involve the exchange of data between communication nodes from different wellbores, which may be coupled together by gateways. By way of example, the communication network may involve transmitting and/or receiving signals or tones via one or more frequencies of acoustic tones in the form of data packets via the tone transmission medium. The downhole wireless communication through the tubular members, such as casing and/or production tubing, may be beneficial for enhancing hydrocarbon operations, such as optimizing drilling, optimizing and managing completions, and performing well management. In such communications, the communication network may include communication nodes that utilize ultrasonic acoustic frequencies to exchange information.

In certain configurations, the communication nodes may include a housing that isolates various components from the associated environment, such as a surface environment and/or a wellbore environment. In particular, the communication nodes may include one or more encoding components, which may be configured to generate and/or to induce one or more acoustic tones within tone transmission medium, such as a tubular member or liquid inside the tubular member. Alternately, conduit refers to an acoustic channel of liquid which may, for example, exist between the formation and a tubular member. In addition, the communication nodes may include one or more decoding components, which may be configured to receive and/or decode acoustic tones from the tone transmission medium. The communication nodes may include one or more power supplies configured to supply energy to the other components, such as batteries. The communication nodes may include one or more sensors, which may be configured to obtain measurement data associated with the downhole environment and/or the formation. The communication nodes may include relatively small transducers to lessen the size of the communication nodes, such that they may be disposed or secured to locations having limited clearance, such as between successive layers of downhole tubular members. As an example, small acoustic transducers may be configured to transmit and/or receive tones.

In one configuration, the present techniques may involve a low-cost method to monitor well production performance for effective and efficient management of unconventional hydrocarbon fields. The desirable parameters to be monitored may include, for individual well, the material being produced (e.g., oil, gas, water, and sand), rate of production of each phase, and temporal trend of the production, and for a portion or whole hydrocarbon field, the temporal and spatial distribution of the production and performance of each of the wells in the hydrocarbon field. While wireless communication networks may be used for sensing and monitoring, conventional sensing technologies involve intrusive sensing methods for flow measurement, such as differential pressure sensing of flow-restrictive devices (e.g., orifice, pitot-tube, and the like), internal rotating devices (e.g., turbines), and radioactive methods for material identification. The present techniques utilize a wireless monitoring system that incorporates non-intrusive acoustic sensors that may be part of a communication node and wireless network technologies, which may be installed on or within a wellhead with minimal installation cost. The communication nodes having sensors or sensing components may be further extended to the downhole environment, installed on production tubing and/or casing to monitor the production from multiple zones, which may also be on multiple wells. The remote monitoring data from each individual well in a hydrocarbon field may be aggregated for effective and efficient management of the hydrocarbon field.

In certain configurations, the present techniques provides a measurement and information management system having various features. As a first feature, the system may include a non-intrusive acoustic measurement device that may be disposed on a tubular member (e.g., glued, welded, and/or mechanically secured) or wellhead without interrupting the production operations and may be performed with minimal installation effort.

As a second feature, the present techniques may include a communication node that is a self-contained device, which may be inserted into a threaded port that has direct, or indirect acoustic coupling to a production tubular, casing annulus or other maintenance or production port on a wellhead or other surface equipment. Such communication node may be installed on a tree associated with the respective wellbore. Such communication nodes may be useful for both injection equipment (e.g., injection of water, gas, hydraulic fracture fluids, proppants, and/or tracers) and/or production equipment (with or without artificial lift pumps or gas lift mechanisms).

A third feature is that the communication nodes may be equipped with a set of sensors, signal processing and data fusion capability for real-time measurement of the well production or injection rates including the material being produced and flow rate of each phase.

As a fourth feature, the communication network may include one or more gateway devices or nodes to manage the communication to the control unit. For example, the communication nodes may be equipped with wireless communication capability that are used for communicating measurement data to a gateway, and then from the gateway to a central server or control unit via long-range communication to form a sensor network of a hydrocarbon field. The topside node and/or gateway node may also store sensor data from various nodes for deferred transmission to remote users. Additionally, the gateways may replicate one another's data to facilitate data fusion and provide fault tolerance against a subset of the gateway devices becoming non-functional.

As a fifth feature, the communication nodes may be equipped with external power sources and/or a rechargeable power supply. For example, certain communication nodes, which are above the surface and/or associated with the tree may be equipped with a rechargeable battery with solar panel and/or wind-turbine for self-sufficient power. Other examples include communication nodes that are powered by vibration, or direct connection to local power source (e.g. that used for artificial lift pumps). The gateway node may optimize wide area transmissions (e.g., 3G, 4G, satellite, coaxial trunk, fixed wireless, microwave, etc.) for times when maximum energy is available (e.g., windy times, maximum sunlight, when battery has a certain minimum charge level, etc.). Additionally, the gateway devices may engage in staggered sleep modes, such that some communication nodes sleep, while others communication nodes are available to receive sensor data and as sleeping gateway node wakes, then the data may be replicated, such that the gateway node ultimately has a complete set of sensor data. The staggered sleep mode, data replication, and deferred transmission may be useful.

In a sixth feature, the housing for the communication node may be adjusted based on the associated environment. For example, the housing for communication nodes above the surface may be an explosion-proof enclosure for classified hazardous areas.

A seventh feature may include a communication network with capabilities of continuous updating well data for the various wellbores and may share the updated data to enhance the performance of the overall field measurements. The system may take action based on the 3D production profile to affect operation of the well or associated tools, such as changing the activation times and duty cycle of specific pump jacks in the field. The system may also change production controls in the field, such as taking actions causing field production to decrease when a nearby storage tank is filled beyond a certain level, and increasing field production when a nearby storage tank is filled to less than a certain level.

In one configuration, a communication node may include an acoustic sensor for nonintrusive measurement of material phase and flow rate through a portion of a well or through a portion of the production equipment. To obtain production data for the hydrocarbon field, the communication nodes may be used to measure and to estimate the material phases and their flow rates in real time or concurrently at the respective locations for each individual well. To obtain the data, the sensing method used in the communication nodes may involve a pair of acoustic transducers attached on tubular member and separated over a specific distance. The transducers may include a narrow-band ultrasonic transmitter that generates waves of certain ultrasonic frequencies either continuously, within certain windows or as needed, and a broadband receiver that may be used to sense both audible and ultrasonic vibration. Alternatively, the configuration may include the use of transmitter and receiver pair at an injection wellhead to monitor injection fluids and/or returned fluids or multiphase (e.g., gas, liquid, solid) flows.

In another configuration, the communication node may perform signal processing and data fusion. In this method, the transmitter generates waves of pre-selected one or more ultrasonic frequencies, and the receiver acquires the vibration from the tubular member, which is superposition of ultrasonic waves from the transmitter and other noises including flow-induced noise and background noise. The composite signals at the receiver may be separated into two components, which are the ultrasonic component and the audible component. The composite signal may be separated by one or more filtering methods. Extracted ultrasonic signals may be related to the property of the medium or fluid flowing inside the tubular member, and the audible signals may be related to the flow velocity within the tubular member. With proper calibration, ultrasonic and audible signals may be used to detect both fluid or medium (e.g., gas, water and/or oil) and flow velocity inside the tubular member at the same time. Thus, the average flow rate of each phase (e.g., gas, water, and/or oil) can be estimated over a given time interval.

In yet another configuration, the present techniques may be used for water and/or gas breakthrough during production operations. Water and/or gas breakthrough is one aspect that is managed in hydrocarbon operations, such as reservoir management. The communication network provides monitoring capability of water and/or gas breakthrough events. A series of communication nodes may include sensors that may be integrated with the hydrocarbon system to capture the changes before and after the breakthrough of the monitored fluid. The sensors in the communication nodes may include pressure, temperature, resistivity, capacitance, pH, chemical sensors. The event time and location may be recorded and the data may be relayed to the surface for production optimization. The present techniques may involve customizing data dissemination based on a priority (e.g., determined according to certain criteria, such as sending certain data sooner.)

In still yet another configuration, the present techniques may be used for slug detection. Some wells may experience slugging issues because of changing flow conditions. Large and frequent slugging may damage production facilities. Slugging also results in higher bottom hole pressure and thus decrease the production. The communication network may include communication disposed along the tubular members, such as production tubing, may monitor the slugging events, including location, frequency, and amplitude. The data may be collected through various sensors in one or more communication nodes, including pressure, acoustics, strain, capacitance, resistivity sensors, and the like. Further, elimination procedure can be planned based on the monitoring data.

In a further configuration, the communication network may be used to manage the communication for the communication nodes. The communication nodes may include sensors in a hydrocarbon field and may be distributed in or associated with a large number of wells. The communication nodes may be organized into clusters based on either distance or homogeneity of the reservoir property and/or both. Within each cluster, the communication nodes can communicate the data to a gateway node with short-range wireless communication techniques, such as ZigBee. The gateway node for each cluster may communicate with a central server and/or a control unit, which may be coupled to the network by wired Ethernet, by wireless Wi-Fi and/or mobile wireless communication technologies (e.g., 3G or 4G . . . ).

In yet another configuration, the communication nodes may include network intelligence, and continuous learning for measurement improvement. In each communication node, the communication node may include network intelligence component. The network intelligence component may be embedded decision managing software agents in addition to multiple signal processing and data fusion algorithms. The network intelligence component may be configured to detect and remove abnormal data points, conduct self-diagnosis of communication node or sensor health and battery condition, selection of a different algorithm, technique, or method for different flow regimes (e.g., single phase or multiphase, homogenous or annular or plug flow, or pulsing flow or flow with sand). Further, the gateway nodes may also include embedded data managing agents that are configured to manage and aggregate the flow information from the well of the cluster, and communicate the data to the central server or control unit. Then, the control unit may include data managing software that provides capability of high-level data and information management. The communication node, the gateway node and control unit each have certain learning capabilities and may be configured to share the learning throughout whole network.

In addition, other configurations may use the present techniques to perform field-wise production and injection optimization. The distributed communication nodes on the production tubing may collect various information related with production. The information from each well may serves as the profile of the production conditions in the respective well. After combining the information from the whole hydrocarbon field, a three-dimensional (3D) production profile can be generated. By way of example, a water and/or gas breakthrough information (e.g., depth, location, direction, rate, and the like), the connectivity of adjacent wells may be derived. These information can be further used for injection planning, slugging elimination, or other optimization purposes. Valves in the hydrocarbon field can also be optimized to maintain the reservoir pressure to improve the overall field production.

In certain configurations, the communication device may include performing ultrasonic telemetry and sensing in specific frequency bands. As an example, the communication network may utilize low-frequency ranges and/or high-frequency ranges (e.g., may include low-frequency communication nodes and/or high-frequency communication nodes). The low-frequency communication nodes may be configured to transmit signals and to receive signals that are less than or equal to ($\leq$) 200 kHz, $\leq$100 kHz, $\leq$50 kHz, or $\leq$20 kHz. In particular, the low-frequency communication nodes may be configured to exchange signals in the range between 100 Hz and 20 kHz; in the range between 1 kHz and 20 kHz; and in the range between 5 kHz and 20 kHz. Other configurations may include low-frequency communication nodes, which may be configured to exchange signals in the range between 100 Hz and 200 kHz; in the range between 100 Hz and 100 kHz; in the range between 1 kHz and 200 kHz; in the range between 1 kHz and 100 kHz; in the range between 5 kHz and 100 kHz and in the range between 5 kHz and 200 kHz. The communication nodes may also include high-frequency communication nodes configured to transmit and receive signals that are greater than (>) 20 kHz, >50 kHz, >100 kHz or >200 kHz. Also, the high-frequency communication nodes may be configured to exchange signals in the range between greater than 20 kHz and 1 MHz, in the range between greater than 20 kHz and 750 kHz, in the range between greater than 20 kHz and 500 kHz. Other configurations may include high-frequency communication nodes, which may be configured to exchange signals in the range between greater than 100 kHz and 1 MHz; in the range between greater than 200 kHz and 1 MHz; in the range between greater than 100 kHz and 750 kHz; in the range between greater than 200 kHz and 750 kHz; in the range between greater than 100 kHz and 500 kHz; and in the range between greater than 200 kHz and 500 kHz.

In such configurations, the low frequency bands and/or high-frequency bands may utilize piezoelectric systems to enhance operations. The communication coupling device may include piezo transducers that may be coupled to the environment to be sensed (e.g., pulse echo from piezo assembly behind a thin steel wall and thus proximate flowing media, hydrates, sand, which may be within the tubular member). The configurations may include the use of acoustic or other transducer arrays spaced on an azimuth. Such transducer arrays may be used to launch single mode acoustic or vibrational waves that may be tailored for one or more of: (i) long distance telemetry, (ii) focusing the acoustic energy in steel tubular, or within media, or outside of surface of tubular, (iii) for one or more piezoelectric transducers, the termination properties, coupling to adjoining tubular members, and preferable acoustic wave properties that may be enhanced by the radial design versus a point or wide line attachment.

In still yet another configuration, the electronic circuits are present within the communication device (e.g., including the communication nodes) to process the collected measurement data, store the data for transmission, and conduct necessary on-board computation to simplify data for transmission. Local detection of faulty data, data compression, and automated communication with neighboring sensors may be carried out with the on-board electronics, signal processing components and microprocessor.

In another configuration, the communication nodes may include a communication node (e.g., configured to function as a transmitter and/or receiver) for data transmission to topside communication nodes or other devices. In other configurations, multiple different types of devices may be connected. For example, if it is an acoustic system, piezos may be facilitated as a transmitter and a receiver to relay data back to topside or other wireline tools. If it is an electromagnetic system, then radio-frequency receivers with communication frequency ranges may be integrated.

In other configurations, the communication network may include communication nodes (e.g., configured to function as a transmitter and/or receiver) that may be oriented to receive and/or transmit inside the tubular member, outside the tubular member and/or a combination thereof. The range of the communication nodes may be extended by broadcasting directly into the tubular member versus receiving and transmitting on the exterior of the tubular member. In addition, the reliability and quality of the acoustic transmission when broadcasting into the tubular member may be enhanced.

In addition, other configurations may include the communication network may include gateway nodes integrated into communication network, which may be used to manage a set of wells. Such an integration may enhance the operations of the system by managing the data from the different wells. The use of the gateway node may enhance reliability by efficiently managing the communication from various wells to the control unit.

The configuration may include various enhancements. For example, because the wells may be in a remote or difficult-to-access location, the gateway nodes may operate on battery power and/or be otherwise power constrained. To reduce maintenance, the gateway nodes may be configured to operate in a sleep mode for various time periods. Further, the sleep behavior (e.g., sleep mode, which may vary for time, duration, etc.) may be modified as a result of an adaptive learning method or recognized pattern. Further, the downhole communication nodes for multiple wells in a field may synchronize the sensors, such that the resulting data yields a three dimensional (3D) profile (e.g., spatially across the field at various depths). Further still, the system may be configured to learn the degree to which the inflow points on various wells impact one another. For example, a particular zone in well A may be strongly related to a range of zones associated with wells B and C, but only weakly related to other zones associated with wells B and C, and may be unrelated to well D. Further, these relationships may change over time, and the system (e.g., control unit or top nodes) may track the dynamic relationships. Based on the above, the system may use learned relationships in combination with certain current sensor data, to provide a proactive alert to designated operators. These alerts or notifications may help an operator or automated system perform an action to optimize ongoing production of a particular well or across a field of wells. For example, the production of a particular well may be halted or adjusted to stimulate production in several other wells at certain moments in time. Adding to the above, the system may generate 3D production contour maps and can generate animations to show the evolution of the 3D production contour over time.

By way of example, the sensors may include a fiber optics or other sensors. Using interpretation techniques, the data may be used to evaluate fluid composition and/or fluid type in the nearby formation. Assessing some of these properties may involve additional data or knowledge of the system (e.g., well data).

In one embodiment, a method of communicating data among a plurality of communication nodes in a communication network is described. The method comprising: obtaining field data for a hydrocarbon system; creating a communication network configuration based on the obtained field data for a communication network, wherein the communication network includes a plurality of communication nodes; configuring the plurality of communication nodes based on the communication network configuration; configuring a control unit based on the communication network configuration and configured to exchange data packets with the plurality of communication nodes; installing the communication nodes in the hydrocarbon system; and exchanging data packets to between the plurality of communication nodes and the control unit to perform hydrocarbon operations for the hydrocarbon system.

In other embodiments, one or more enhancements are described. The method may further comprising identifying one or more parameters to be measured for the hydrocarbon system; wherein one or more of the plurality of the communication nodes are configured to detect the one or more parameters; further comprising: obtaining measurements from one or more of the plurality of communication nodes, wherein the plurality of communication nodes are disposed along one or more tubular members, transmitting the obtained measurement from the one or more of the plurality of communication nodes to the control unit, and performing hydrocarbon operations based on the obtained measurements; wherein each of the one or more of the plurality of communication nodes is configured to detect one of water breakthrough, gas breakthrough and any combination thereof; wherein each of the one or more of the plurality of communication nodes is configured to measure one of detect pressure, temperature, resistivity, capacitance, pH, and any combination thereof; wherein each of the one or more of the plurality of communication nodes is configured to detect changes in fluid flow through one of the tubular members; wherein each of the one or more of the plurality of communication nodes is configured to measure one of pressure, acoustics, strain, capacitance, resistivity and any combination thereof; wherein installing the communication nodes in the hydrocarbon system comprises: disposing a first set of communication nodes from the plurality of communication nodes into a first well, disposing a first topside communication node from the plurality of communication nodes to a first tree associated with the first well, disposing a second set of communication nodes from the plurality of communication nodes into a second well, and disposing a second topside communication node from the plurality of communication nodes to a second tree associated with the second well; wherein the first topside communication node is configured to measure fluid flow from the first well; and/or wherein the second topside communication node is configured to measure fluid flow from the second well; wherein the first topside communication node is configured to measure fluid composition from the first well; and/or wherein the second topside communication node is configured to measure fluid composition from the second well; wherein one of the communication nodes in the first well is configured to measure fluid flow within the first well; and/or wherein one of the communication node in the second node is configured to measure fluid flow within the second well; wherein one of the communication nodes in the first well is configured to measure fluid composition within the first well; and/or wherein one of the communication nodes in the second well is configured to measure fluid composition from the second well; wherein one of the communication nodes in the first well is configured to measure temperature within the first well; and/or wherein one of the communication node in the second node is configured to measure temperature within the second well; wherein one of the communication nodes in the first well is configured to measure pressure within the first well; and/or wherein one of the communication nodes in the second well is configured to measure pressure from the second well; wherein the first topside communication node and the second topside communication node are each configured to communicate via one of radio frequencies, physical connections and any combination thereof and the communication nodes with the first well and second well are configured to communicate via acoustically; further comprising: configuring one or more gateway nodes based on the communication network configuration, wherein at least one of the one or more gateway nodes is configured to exchange data packets between the first topside communication node and the control unit based on the communication network configuration and to exchange data packets between the second topside communication node and the control unit based on the communication network configuration, installing the one or more gateway nodes in the hydrocarbon system, and exchanging data packets to between the first topside communication node and control unit via the at least one of the one or more gateway nodes and between the second topside communication node and control unit via the at least one of the one or more gateway nodes; wherein the creation of the communication network comprises selecting one of one or more frequency bands, one or more individual tones, one or more coding methods, and any combination thereof; wherein the communicating between the plurality of communication nodes comprises exchanging low-frequency signals that are less than or equal to ($\le$) 20 kilohertz; wherein the communicating between the plurality of communication nodes comprises exchanging low-frequency signals that are in the range between 100 hertz and 20 kilohertz; wherein the communicating between the plurality of communication nodes comprises exchanging high-frequency signals that are greater than ($>$) 20 kilohertz; wherein the communicating between the plurality of communication nodes comprises exchanging high-frequency signals that are in the range between greater than 20 kilohertz and 1 megahertz; further comprising determining whether to adjust hydrocarbon operations based on the exchanged data packets to between the plurality of communication nodes and the control unit; further comprising performing the adjustment to hydrocarbon operations based on the determination; wherein the field data is associated with equipment installed within the wellbores and associated wellbore equipment; and/or further comprising modeling fluid compositions in the hydrocarbon system based on the data packets.

A hydrocarbon system is described. The system comprising: a plurality of wellbores in a hydrocarbon system; a plurality of tubular members disposed in the plurality of wellbores; a communication network associated with the hydrocarbon system, wherein the communication network comprises a plurality of communication nodes that are configured to communicate operational data between two or more of the plurality of communication nodes during hydrocarbon operations; and a control unit associated the hydrocarbon system and configured to exchange data packets with the plurality of communication nodes. Also, the communication network may comprise a plurality of communication nodes, a plurality of topside nodes and one or more gateway nodes that are configured to communicate operational data between two or more of the plurality of communication nodes during hydrocarbon operations, plurality of topside nodes and one or more gateway nodes.

Beneficially, the present techniques provide various enhancements to the operations. Accordingly, the present techniques may be further understood with reference to FIGS. 1 to 9, which are described further below.

FIG. 1 is an exemplary schematic representation of a hydrocarbon system 100 configured to utilize the methods according to the present techniques. The hydrocarbon system 100 is configured to utilize a network 102 having the proposed configuration of communication nodes 120 for various wells 104. The wells 104 includes a wellbore that extends from above the surface 110 to subsurface regions 112 and 114, which may include hydrocarbons. Each of the wellbores of the wells 104, which may include tubular sections, which may be formed of carbon steel, such as a casing or liner. The wells 104 may be used as hydrocarbon wells, production wells, and/or injection wells. As may be appreciated, the wells may be coupled together with manifolds or tubular members, which may also include communication nodes disposed on the manifolds or tubular members.

Each of the wells 104 may include individual acoustic wireless networks. The acoustic wireless network also may be referred to herein as a downhole acoustic wireless network that includes various communication nodes 120 and a topside communication node and/or control unit 122. The communication nodes 120 may be spaced-apart along a tone transmission medium that extends along a length of wellbore. In the wells 104, the tone transmission medium may include a downhole tubulars, wellbore fluid, a portion of subsurface region 114 that is proximal wellbore, a portion of subterranean formation 112 and 114 that is proximal wellbore. The topside communication nodes 122 for various wells 104 may be configured to communicate with a gateway node, such as gateway nodes 126. The gateway nodes 126 may exchange data over a network 102.

Nodes 120, 122 and 126 may include different components to manage the communication between the different equipment. For example, the nodes 120, 122 and 126 may include encoding components, which may be configured to generate an acoustic tone, and/or may include decoding components, which may be configured to receive acoustic tone from the tone transmission medium. Also, certain nodes, such as communication nodes 120, may include sensing components configured to measure or to monitor one or more properties.

Figure 2:
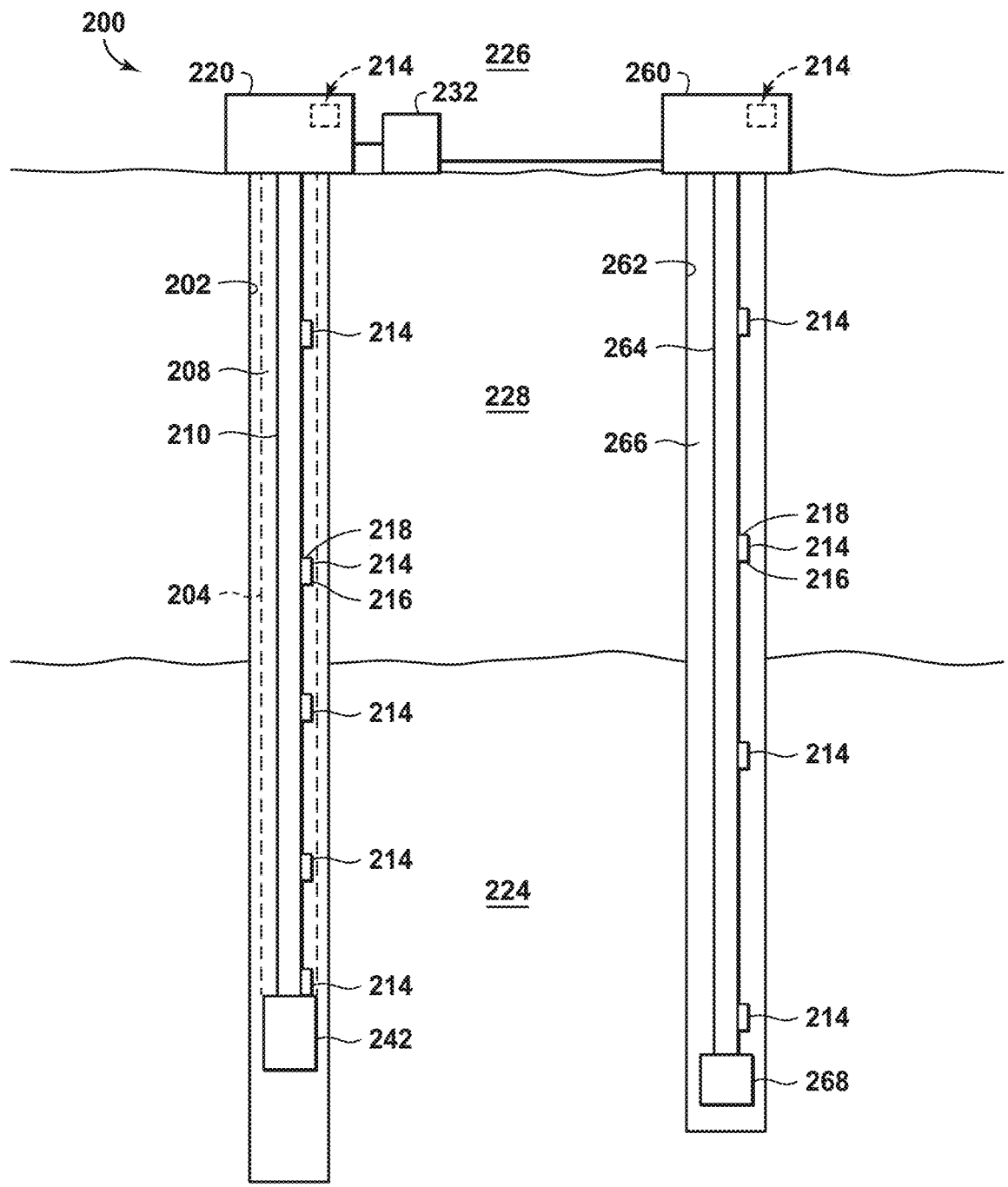
FIG. 2 is another exemplary schematic representation of a well configured to utilize the methods according to the present disclosure.

FIG. 2 is a schematic representation of a well system 200 configured that utilizes a network having the proposed configuration of communication nodes. The well system 200 includes wellbores 202 and 262 that extend from surface equipment 220 or 260 to a subsurface region 228. Wellbores 202 and 262 also may be referred to herein as extending between a surface region 226 and subsurface region 228 and/or as extending within a subterranean formation 224 that extends within the subsurface region. The wellbores 202 and 262 may include a plurality of tubular sections, which may be formed of carbon steel, such as a casing or liner. Subterranean formation 224 may include hydrocarbons. The wells in the well system 200 may be hydrocarbon wells, production wells, and/or injection wells.

Well system 200 also includes an acoustic wireless network. The acoustic wireless network also may be referred to herein as a downhole acoustic wireless network that includes various communication nodes 214 and a topside communication node and/or control unit 232. The communication nodes 214 may be spaced-apart along a tone transmission medium that extends along a length of wellbores 202 and 262. In the context of well system 200, the tone transmission medium may include downhole tubulars 210 and 264 that may extend within wellbore 202, a wellbore fluid 204 that may extend within wellbores 202 and 262, a portion of subsurface region 228 that is proximal wellbores 202 and 262, a portion of subterranean formation 224 that is proximal wellbores 202 and 262, and/or a cement that may extend within wellbores 202 and 262 and/or that may extend within an annular region between wellbores 202 and 262 and the respective downhole tubulars 210 and 264. Downhole tubulars 210 and 264 may define the respective fluid conduits 208 and 266. Each of the wellbores 202 and 262 may include downhole completions 242 and 268, which are configured to pass hydrocarbons from the subterranean formation 224 into the downhole tubulars 210 and 264.

Communication nodes 214 may include one or more encoding components 216, which may be configured to generate an acoustic tone and/or to induce the acoustic tone within tone transmission medium. Communication nodes 214 also may include one or more decoding components 218, which may be configured to receive acoustic tone from the tone transmission medium. The communication nodes 214 may function as both an encoding component 216 and a decoding component 218 depending upon whether the given node is transmitting an acoustic tone (e.g., functioning as the encoding component) or receiving the acoustic tone (e.g., functioning as the decoding component). The communication nodes 214 may include both encoding and decoding functionality, or structures, with these structures being selectively utilized depending upon whether or not the given communication node is encoding the acoustic tone or decoding the acoustic tone. In addition, the communication nodes 214 may include sensing components that are utilized to measure, control, and monitor conditions within the wellbore 202.

In wells 200, transmission of acoustic tone may be along a length of wellbore 202. As such, the transmission of the acoustic tone is substantially axial along the tubular member, and/or directed, such as by tone transmission medium. Such a configuration may be in contrast to more conventional wireless communication methodologies, which generally may transmit a corresponding wireless signal in a plurality of directions, or even in every direction.

The communication nodes 214, which are discussed in more detail herein, are disclosed in the context of well 200, such as a hydrocarbon well. However, it is within the scope of the present disclosure that these methods may be utilized to communicate via an acoustic tones in any suitable network, such as any acoustic wireless network. As examples, the communication network may be used in a subsea well and/or in the context of a subsea tubular member that extends within a subsea environment. Under these conditions, the tone transmission medium may include, or be, the subsea tubular member and/or a subsea fluid that extends within the subsea environment, proximal to the subsea tubular member, and/or within the subsea tubular member. As another example, the communication network in the context of a surface tubular that extends within the surface region. Under these conditions, the tone transmission medium may include, or be, the surface tubular member and/or a fluid that extends within the surface region, proximal to the surface tubular member, and/or within the surface tubular member.

The plurality of frequencies, which are utilized in the communication nodes 214, may include the first frequency for a first type of communication node type and/or a second frequency for a second type of communication node type. Each of the wireless network types may be utilized in different configurations to provide the communication for the hydrocarbon operations. The respective frequency ranges may be any suitable values. As examples, each frequency in the plurality of high-frequency ranges may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz.

Figure 3A:
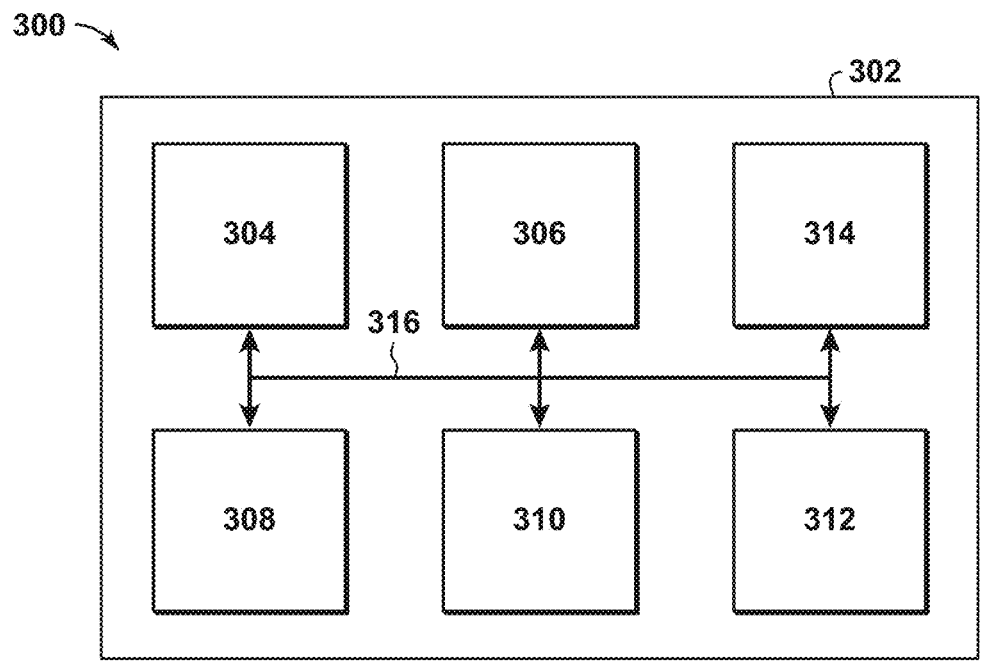
FIGS. 3A and 3B are exemplary views of communications nodes of FIG. 2.
Figure 3B:
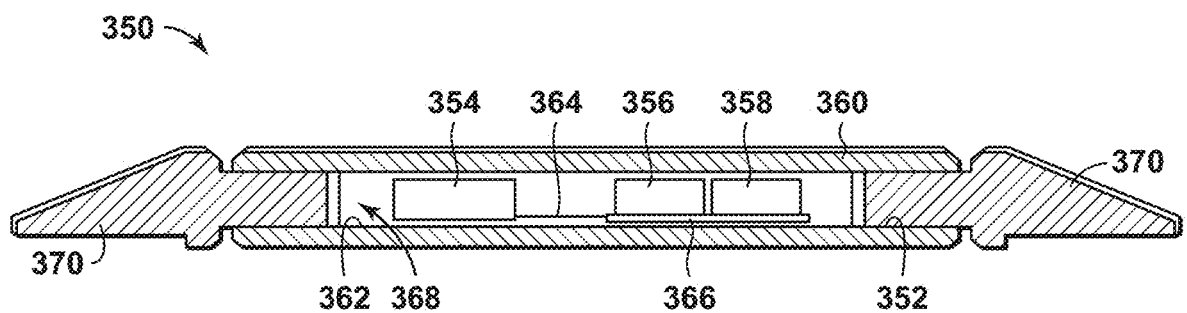

The communication nodes 214 may include various configurations, such as those described in FIGS. 3A and 3B. The communications node may be disposed on a conduit and/or a tubular section within the wellbore. The communication nodes may be associated with equipment, may be associated with tubular members and/or may be associated with the surface equipment. The communication nodes may also be configured to attach at joints, internal or external surfaces of conduits, surfaces within the wellbore, or to equipment.

As a specific example, the communications nodes may be structured and arranged to attach to the surface (e.g., internal or external surface) of conduits at a selected location. This type of communication node may be disposed in a wellbore environment as an intermediate communications node between the surface and any communication nodes associated with the equipment and/or sensors. The communication nodes may be disposed on each tubular member, or may be disposed on alternative tubular members. By way of example, the communications node may be welded onto the respective surface or may be secured with a fastener to the tubular member (e.g., may be selectively attachable to or detachable from tubular member). The fastener may include the use of clamps (not shown), an epoxy or other suitable acoustic couplant may be used for chemical bonding. By attaching to the external surface of the tubular member, the communication nodes may not interfere with the flow of fluids within the internal bore of the tubular section.

FIG. 3A is a diagram 300 of an exemplary communication node. The communication node 300 may include a housing 302 along with a central processing unit (CPU) 304, memory 306, which may include instructions or software to be executed by the CPU 304 one or more encoding components 308, one or more decoding components 310, a power component 312 and/or one or more sensing components 314, which communicate via a bus 316. The central processing unit (CPU) 304 may be any general-purpose CPU, although other types of architectures of CPU 304 may be used as long as CPU 304 supports the inventive operations as described herein. The CPU 304 may contain two or more microprocessors and may be a system on chip (SOC), digital signal processor (DSP), application specific integrated circuits (ASIC), and field programmable gate array (FPGA). The CPU 304 may execute the various logical instructions according to disclosed aspects and methodologies. For example, the CPU 304 may execute machine-level instructions for performing processing according to aspects and methodologies disclosed herein. The memory 306 may include random access memory (RAM), such as static RAM (SRAM), dynamic RAM (DRAM), synchronous DRAM (SDRAM), or the like, read-only memory (ROM), such as programmable ROM (PROM), erasable PROM (EPROM), electronically erasable PROM (EEPROM), or the like. In addition, the memory 306 may include NAND flash and/or NOR flash. Further, the power component 312 may be disposed in the housing 302 and may be configured to provide power to the other components. The power component 312 may include one or more batteries.

To manage the communications, the communication node 300 may utilize the one or more encoding components 308 and one or more decoding components 310 within the housing 302. The encoding components 308, which may include one or more transducers, may be disposed within the housing 302 and may be configured to generate an acoustic tones and/or to induce the acoustic tone on a tone transmission medium. The one or more decoding components 310, which may include one or more transducers, may be disposed within the housing 302 and may be configured to receive acoustic tones from the tone transmission medium. The encoding and decoding components 308 and 310 may include instructions stored in memory and utilized to perform the generation of the acoustic tones or decoding of the acoustic tones along with compression or decompression of the data packets into the acoustic tones. The encoding component 308 and decoding component 310 may utilize the same transducer in certain configurations.

The one and/or more sensing components 314 may be configured to obtain sensing data and communicate the obtained measurement data to other communication nodes. By way of example, the sensing components 314 may be configured to obtain pressure measurements, temperature measurements, fluid flow measurements, vibration measurements, resistivity measurements, capacitance measurements, strain measurements, acoustics measurements, stimulation and/or hydraulic fracture properties measurements, chemicals measurements, position measurements and other suitable measurements.

In yet another exemplary configuration, FIG. 3B is an exemplary cross sectional diagram of a communications node 350 that may be used in the system. The view of the communication node 350 is along the longitudinal axis. The communications node 350 includes a housing 352, which may be fabricated from carbon steel or other suitable material to avoid corrosion at the coupling. The housing 352 is dimensioned to provide sufficient structural strength to protect internal components and other electronics disposed within the interior region. By way of example, the housing 352 has an outer wall 360, which may be about 0.2 inches (0.51 centimeters (cm)) in thickness. A cavity 362 houses the electronics, including, by way of example and not of limitation, a power source 354 (e.g., one or more batteries), a power supply wire 364, a first electro-acoustic transducer 356, a second electro-acoustic transducer 358, and a circuit board 366. The circuit board 366 may preferably include a micro-processor or electronics module that processes acoustic signals.

For communication between communication nodes, the first transducer 356 and the second transducer 358, which may each be electro-acoustic transducers, are provided to convert acoustical energy to electrical energy (or vice-versa) and are coupled with outer wall 360 on the side attached to the tubular member. As an example, the first transducer 356, which may be configured to receive acoustic signals, and a second transducer 358, which may be configured to transmit acoustic signals, are disposed in the cavity 362 of the housing 352. The first and second transducers 356 and 358 provide a mechanism for acoustic signals to be transmitted and received from node-to-node, either up the wellbore or down the wellbore. In certain configurations, the second electro-acoustic transducer 358, configured to serve as a transmitter, of intermediate communications nodes 350 may also produce acoustic telemetry signals. Also, an electrical signal is delivered to the second transducer 358 via a driver circuit. By way of example, a signal generated in one of the transducers, such as the second transducer 358, passes through the housing 352 to the tubular member, and propagates along the tubular member to other communications nodes. As a result, the transducers that generates or receives acoustic signals may be a magnetostrictive transducer (e.g., including a coil wrapped around a core) and/or a piezoelectric ceramic transducer. Regardless of the specific type of transducer, the electrically encoded data are transformed into a sonic wave that is carried through the walls of a tubular member in the wellbore. In certain configurations, a single transducer may serve as both the transmitter and receiver.

Further, the internals of communications nodes 350 may include a protective layer 368. The protective layer 368 resides internal to the wall 360 and provides an additional thin layer of protection for the electronics. This protective layer provides additional mechanical durability and moisture isolation. The intermediate communications nodes 350 may also be fluid sealed with the housing 352 to protect the internal electronics. One form of protection for the internal electronics is available using a potting material.

To secure the communication node to the tubular member, the intermediate communications nodes 350 may also optionally include a shoe 370. More specifically, the intermediate communications nodes 350 may include a pair of shoes 370 disposed at opposing ends of the wall 360. Each of the shoes 370 provides a beveled face that helps prevent the node 350 from hanging up on an external tubular body or the surrounding earth formation, as the case may be, during run-in or pull-out.

By way of examples, the communication network may include various communication nodes. The communication nodes may communicate via acoustic wireless signals, while the topside node may communicate with the communication nodes external to the well and the gateway nodes via radio frequencies, physical connections, and/or wireless communications. The topside node may be configured to store additional data, include various sensors. The gateway node may combine data from various topside nodes and communicate it to the control unit.

To enhance the performance, the communication nodes may be configured to manage different types of wireless networks. For example, a communication node may be configured to operate with different types of networks and may use different frequencies to exchange data, such as low frequencies, high frequencies and/or radio frequencies. Accordingly, the communication nodes may be configured to communicate with each of the types of communication networks and/or may be configured to transmit with one type of communication network and receive with another type of communication network. In certain configurations, the acoustic waves may be communicated in asynchronous packets of information comprising various separate tones. In other configurations, the acoustic telemetry data transfer may involve multiple frequency shift keying (MFSK). Any extraneous noise in the signal is moderated by using well-known analog and/or digital signal processing methods. This noise removal and signal enhancement may involve conveying the acoustic signal through a signal conditioning circuit using, for example, one or more bandpass filters.

As may be appreciated, the method may include recycling to select and optimize the MFSK frequencies, selection of frequency bands, individual tones and/or coding methods. In particular, the method may include determining frequency selection, which may include using a testing unit above grade; dynamically processing above grade and/or downhole; determining preferential coding methods available as a result of profiling; determining clock ticks selection by frequency combining; and/or changing the acoustic media results in different bands. The methods may include disposing communication nodes inside tubular members and/or outside tubular members. In other configurations, the communication nodes may be with other communication nodes, such as one or more hydrophones in a wellbore, equipment along a wireline, or one or more pigs in a pipeline.

Figure 4:
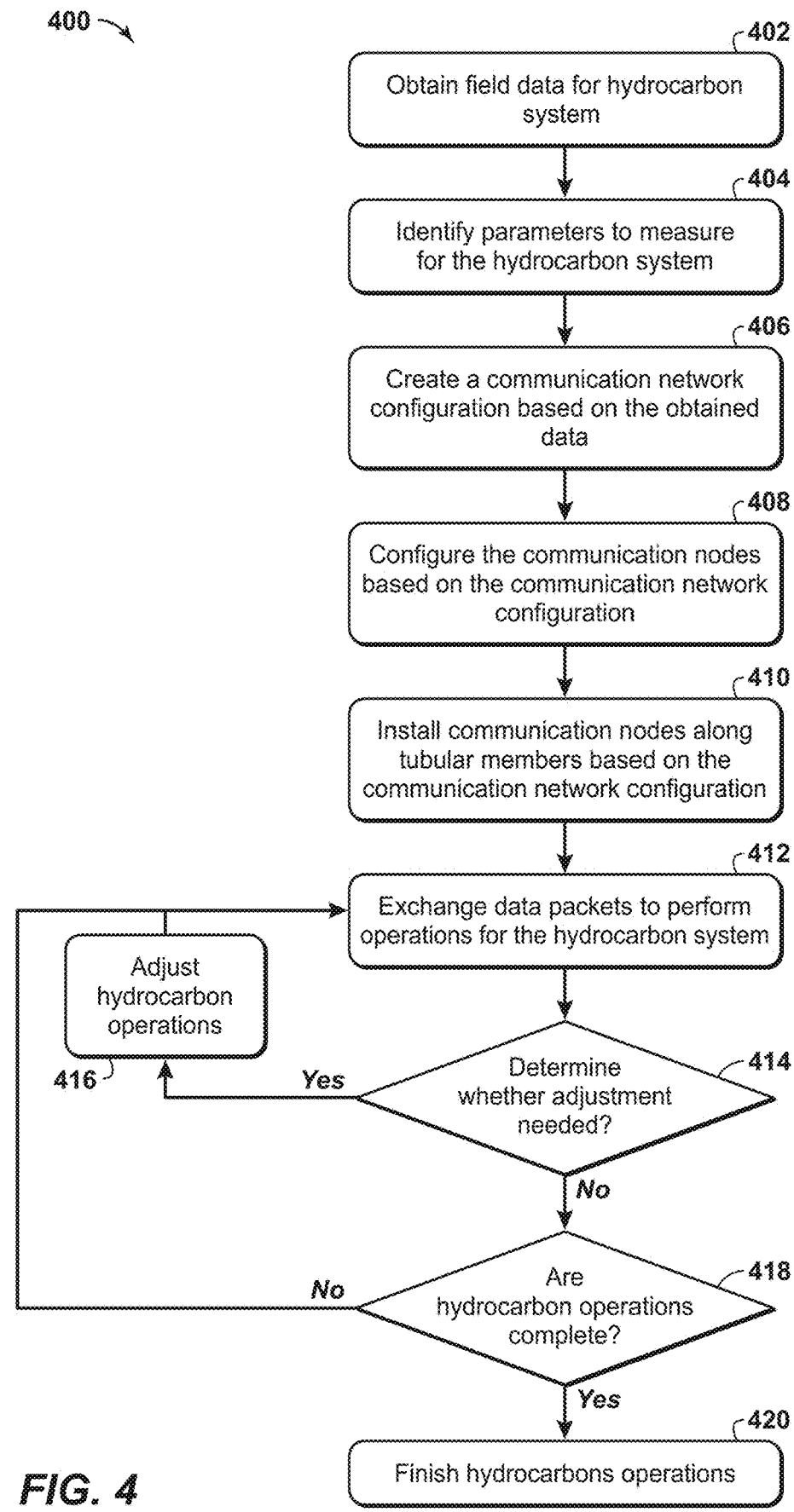
FIG. 4 is an exemplary flow chart in accordance with an embodiment of the present techniques.

FIG. 4 is an exemplary flow chart 400 in accordance with an embodiment of the present techniques. The flow chart 400 is a method for creating, installing and using a communication network for a hydrocarbon system. The method may include creating a communication network and installing the communication network in a hydrocarbon system, as shown in blocks 402 to 410. Then, the communication network may be monitored and hydrocarbon operations are performed, as shown in blocks 412 to 420.

To begin, the method involves creating, installing and using a wireless network for a hydrocarbon system, as shown in blocks 402 to 410. At block 402, field data for a hydrocarbon system is obtained. The hydrocarbon system may include one or more wells to access a subsurface region and the associated production facilities. The field data may include seismic data, vibration data, acoustic data, electromagnetic data, resistivity data, gravity data, well log data, core sample data, and combinations thereof. In other configurations, the field data or well data may include the dimensions and material composition of the tubular members (e.g., the drill strings, production tubing and casing), the material composition of the cement or fluids within the wellbore, length of the tubular members, length of the cement, fluids and/or other information associated with the equipment and/or configuration of the well. Further, the field data may also include temperature, pressures, strain, capacitance, conductivity, flow rate, density, and/or other similar properties. The field data may be obtained from memory, predicted from a model or simulation of the system and/or determined from equipment associated with the system. At block 404, parameters are identified to measure for the hydrocarbon system. The parameters may include temperature, pressures, strain, capacitance, conductivity, flow rate, density, and/or other similar properties, which may be measured by one or more sensors in the communication coupling device. Then, at block 406, a communication network configuration is created based on the obtained data. The creation of the communication network configuration may include settings, such as selecting acoustic frequency bands; selecting individual frequencies; optimizing the acoustic communication band for each pair of communication nodes; determining coding method for the communication network and/or determining selective modes for the communication network. In addition, the creation of the communication network may include determining the noises and associated filters to be used for the communications, determining the directional mode settings for the communication nodes, and determining omnidirectional mode settings for the communication nodes. Further, the communication network may be configured to utilize different network types, such as a physical network and/or a wireless network. For example, communication nodes within the communication network may be configured to operate with different wireless network types, such as low frequency, high frequency and/or radio frequency. Further, communication nodes may be configured to communicate by a hard wire and/or physical connections. Each of these different network types may be used to exchange data packets or signals between different communication nodes, which may directional communication or omnidirectional communications to enhance the hydrocarbon operations. The creation of the communication network may include performing a simulation with a configuration of communication nodes, which may include modeling specific frequencies and/or use of certain type of communication node within specific zones or segments of the wellbores and production facilities. The simulation may include modeling the tubular members, the communication of signals between communication nodes and/or other devices, which may indicate the preferred frequency bands and preferred transmission modes. The simulation results may include the computation of time-varying fluid pressure and fluid compositions and the prediction of signal travel times within the wellbore or within a subsea conduit or pipeline. Performing the simulation may also include modeling fluid, modeling signal transmissions and/or structural changes based on the communication network. Then, the communication nodes are configured based on the communication network configuration, as shown in block 408. The configuration of the communication nodes may include configuring the communication nodes to utilize specific communication settings, such as selecting acoustic frequency bands; selecting individual frequencies; optimizing the acoustic communication band for each pair of communication nodes; determining coding method for the communication network, determining selective modes for the communication network, and/or specific transmission modes (e.g., directional or omnidirectional mode), to enhance the exchange of data (e.g., operational data within the wellbore). The configuration of the communication nodes may include configuring one or more sensors to detect specific properties, such as temperature, pressures, strain, capacitance, conductivity, flow rate, density, and/or other similar properties. The configuration of the communication nodes may also include configuring gateway nodes. Then, at block 410, each of the communication nodes is installed between tubular members based on the communication network configuration. The installation of the communication nodes may include disposing some of the communication nodes between tubular members in respective wellbores and disposing communication nodes on trees associated with wellbores in the hydrocarbon system (e.g., into the respective wellbores). By way of example, installation may include passing one or more tubular member into the respective wellbores, securing the communication nodes to tubular members, then securing one or more tubular members to the communication coupling device and the existing tubular members, disposing one or more tubular members, the communication nodes and the tubular members within the respective wellbores, and repeating the process until the various communication nodes and tubular members are installed into the respective wellbores to form the communication network within the respective wellbores.

Then, the communication network may be utilized for operations, as shown in blocks 412 to 420. At block 412, data packets are exchanged to perform operations for the system. The exchange of data packets may be used to perform operations on the hydrocarbon system, which may be performed concurrently or simultaneously with the hydrocarbon operations. The hydrocarbon operations may include drilling an exploratory well, a production well, an injection well and/or any combination thereof. The hydrocarbon operations may include monitoring a bottomhole assembly, downhole equipment and/or completion, monitoring the tubular members, adjusting the performance of the bottomhole assembly downhole equipment and/or completion, and/or adjusting the hydrocarbon operations. Further, the communication nodes may include exchanging information about the hydrocarbon operations, associated formation and/or other hydrocarbon equipment (e.g., motors and/or other equipment in the bottomhole assembly and/or completions). The hydrocarbon operations may include hydrocarbon exploration operations, hydrocarbon development operations, collection of wellbore data, and/or hydrocarbon production operations. For example, the communication network may be used to estimate well performance prediction. As another example, the communication network may be used to adjust hydrocarbon production operations, such as installing or modifying a well or completion, modifying or adjusting drilling operations and/or installing or modifying a production facility. Further, the results may be utilized to predict hydrocarbon accumulation within the subsurface region; to provide an estimated recovery factor; to adjust perforation operations and/or to determine rates of fluid flow for a subsurface region. The production facility may include one or more units to process and manage the flow of production fluids, such as hydrocarbons and/or water, from the formation.

Then, at block 414, a determination is made whether an adjustment is needed. The determination of hydrocarbon operations may include modeling the flow fluids in the wells and/or production facilities. The modeling may include slug detection, composition detection of the fluids and/or detection of fluid flow from various locations. If an adjustment is determined to be needed, the hydrocarbon operations are adjusted, as shown in block 416. The adjustment of the hydrocarbon operations may include adjusting production facilities equipment, adjusting completions, adjusting pressures, and/or adjusting fluid flow. Then, the data packets are exchanged to perform operations for the system, as shown in block 412. If an adjustment is not determined to be needed, then a determination of hydrocarbons operations is determined, as shown in block 418.

Then, at block 418, a determination is made whether the hydrocarbon operations are complete. If the hydrocarbon operations are not complete, the communication network is used to continue to perform exchanging data to continue performing operations, as shown in block 412. If the hydrocarbon operations are complete, the hydrocarbon operations may be completed, as shown in block 420. The completion of the hydrocarbon operations may involve shutting down operations, and/or removing the tubular members along with the communication nodes from the hydrocarbon system (e.g., from respective wellbores).

Beneficially, the method provides an enhancement in the production, development, and/or exploration of hydrocarbons. In particular, the method may be utilized to enhance communication within the hydrocarbon system (e.g., respective wellbores) by providing a specific configuration that optimizes communication. Further, the enhanced communications may involve less computational effort, may involve less interactive intervention, and/or may be performed in a computationally efficient manner. As a result, this may provide enhancements to production at lower costs and lower risk.

As may be appreciated, the blocks of FIG. 4 may be omitted, repeated, performed in a different order, or augmented with additional steps not shown. Some steps may be performed sequentially, while others may be executed simultaneously or concurrently in parallel. In addition, while FIG. 4 describes the communication network within the wellbores, the method may also be performed along one or more tubular members, such as along a subsea conduit and/or along a pipeline, to enhance associated operations. As a specific example, the communication network may be used along midstream pipelines and storage tanks, and/or the downstream refinery and distribution operations.

As noted in FIG. 4, the wireless network created in block 406 may involve performing various steps. By way of example, the communication network configuration may include performing acoustic frequency band and individual frequencies is selected. The acoustic frequency band and individual frequencies may include each frequency in the plurality of high-frequency ranges, which may be at least 20 kilohertz (kHz), at least 25 kHz, at least 50 kHz, at least 60 kHz, at least 70 kHz, at least 80 kHz, at least 90 kHz, at least 100 kHz, at least 200 kHz, at least 250 kHz, at least 400 kHz, at least 500 kHz, and/or at least 600 kHz. Additionally or alternatively, each frequency in the plurality of high-frequency ranges may be at most 1,000 kHz (1 megahertz (MHz)), at most 800 kHz, at most 750 kHz, at most 600 kHz, at most 500 kHz, at most 400 kHz, at most 200 kHz, at most 150 kHz, at most 100 kHz, and/or at most 80 kHz. Further, each frequency in the low-frequency ranges may be at least 20 hertz (Hz), at least 50 Hz, at least 100 Hz, at least 150 Hz, at least 200 Hz, at least 500 Hz, at least 1 kHz, at least 2 kHz, at least 3 kHz, at least 4 kHz, and/or at least 5 kHz. Additionally or alternatively, each frequency in the high-frequency ranges may be at most 10 kHz, at most 12 kHz, at most 14 kHz, at most 15 kHz, at most 16 kHz, at most 17 kHz, at most 18 kHz, and/or at most 20 kHz. Then, the acoustic communication band and individual frequencies for each pair of communication nodes may be optimized. In addition, the communication network configuration may include determining coding methods for the communication network; and/or determining clock ticks that may be optimized to maximize data communication rate.

As may be appreciated, the communication nodes may be configured with a setting or profile. The settings may include various parameters. The settings may include acoustic frequency band and individual frequencies (e.g., acoustic communication band and individual frequencies for each pair of communication nodes); and/or coding methods (e.g., establishing how many tones to use for MFSK (2, 4, 8, ...) and/or whether to use direct mapping or spread spectrum), and/or tone detection method, such as FFT, ZCR and other methods. The settings may include frequency combining using one or more clock ticks per tone. The tones may be selected to compensate for poor acoustic propagation.

Figure 5A:
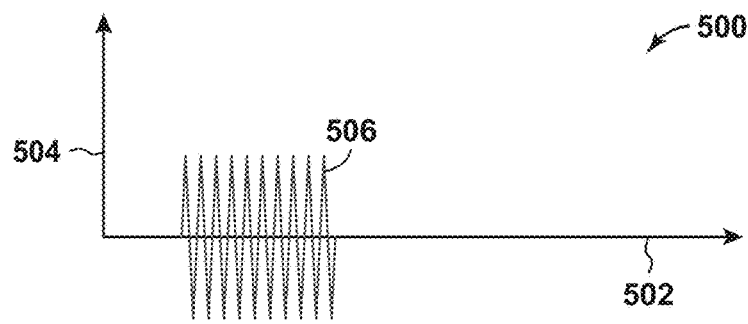
FIGS. 5A, 5B, 5C and 5D are exemplary diagrams of an acoustic communication signals used in a hydrocarbon system.
Figure 5B:
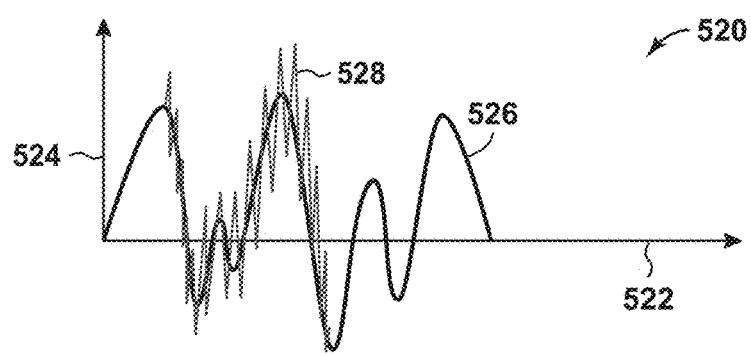
Figure 5C:
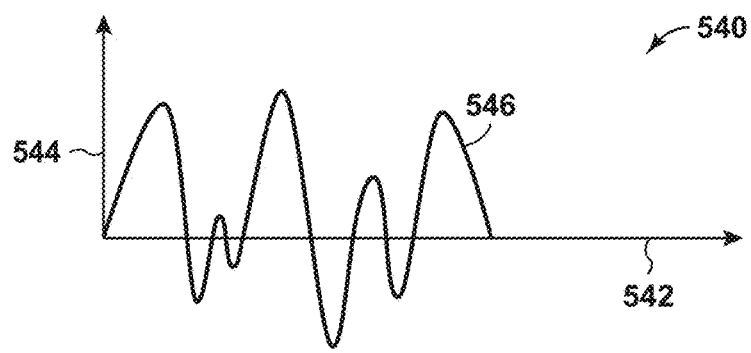
Figure 5D:
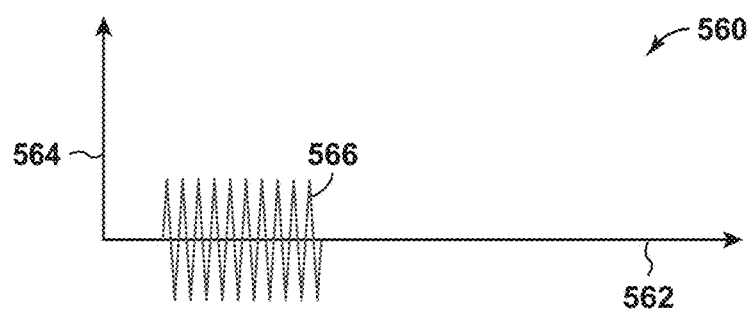

By way of example, the communication network may include transmitting acoustic signals and receiving acoustic signals, as described further in FIGS. 5A, 5B, 5C, 5D, 6, 7, 8 and 9. For example, in FIGS. 5A, 5B, 5C and 5D, various diagrams 500, 520, 540 and 560 are shown for signals transmitted and received from a communication node. In FIG. 5A, a diagram 500 is an exemplary transmitted signal 506 shown along a time axis 502 in seconds versus an amplitude axis 504. In FIG. 5B, a diagram 520 is an exemplary received signal 526 shown along a time axis 522 in seconds versus an amplitude axis 524. The exemplary received signal 526 includes flow induced noise along with ultrasonic waves 528. In FIG. 5C, a diagram 540 is an exemplary flow induced signal 546, which is a flow-induced noise that is generated from a low pass filter, shown along a time axis 542 in seconds versus an amplitude axis 544. In FIG. 5D, a diagram 560 is an exemplary ultrasonic signal 566, which is a ultrasonic waves that is generated from a high pass filter, shown along a time axis 562 in seconds versus an amplitude axis 564.

Figure 6:
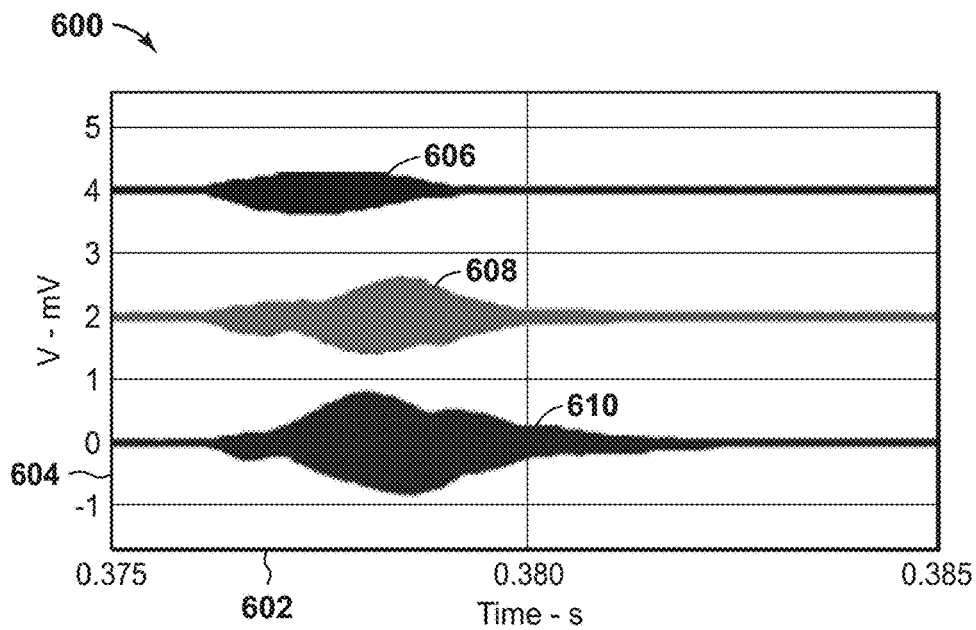
FIG. 6 is an exemplary diagram of an acoustic signal in various environments.

FIG. 6 is an exemplary diagram 600 of an acoustic signal in various environments. In FIG. 6, a diagram 600 are exemplary transmitted signals 606, 608 and 610, which is for 92.219 Kilo-hertz (KHz) shown along a time axis 602 in seconds versus a voltage axis 604 in millivolts. The transmitted signal 606 is an acoustic signal through water, while the transmitted signal 608 is an acoustic signal through oil and transmitted signal 610 is an acoustic signal through air.

Figure 7:
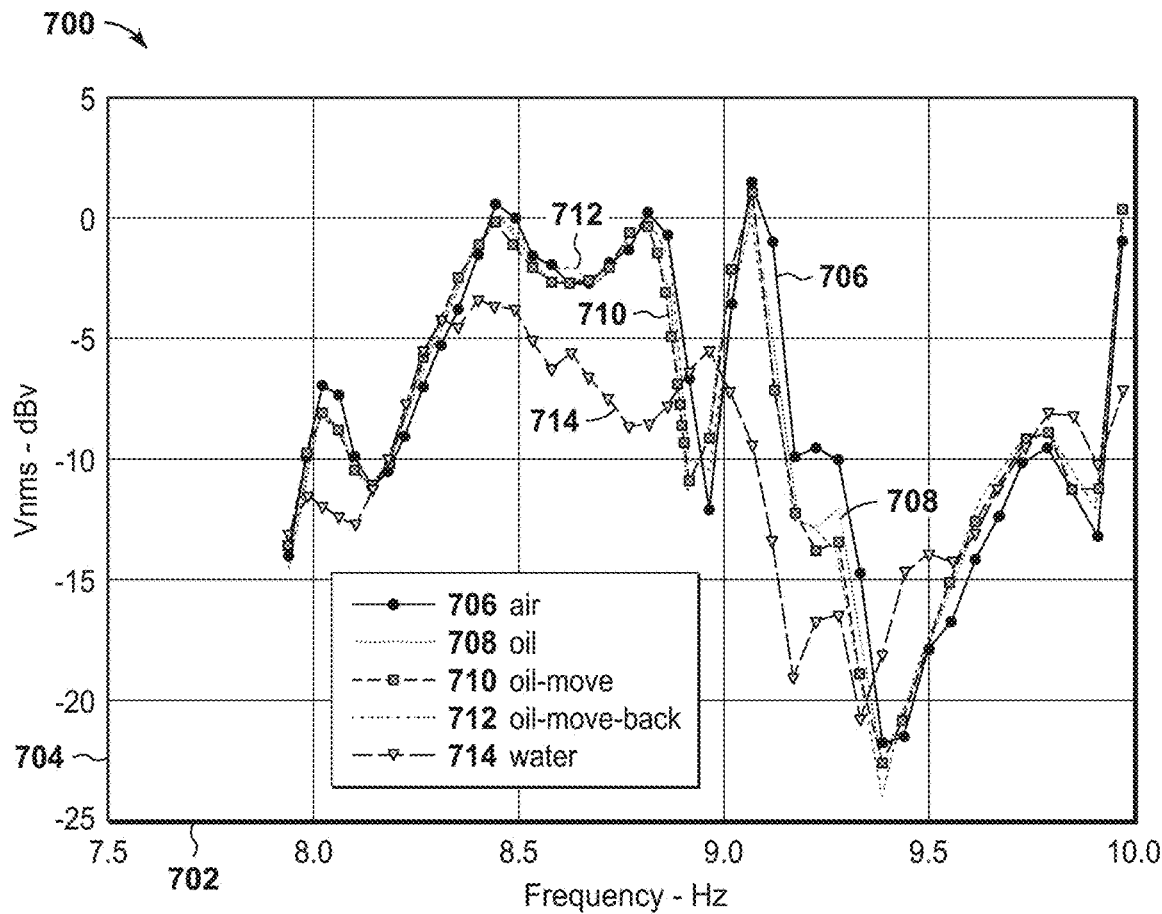
FIG. 7 is an exemplary diagram of an acoustic signal in various environments.

FIG. 7 is an exemplary diagram 700 of an acoustic signal in various environments. The diagram 700 presents the concept of using acoustic signatures to identify medium types, which may include experimental testing results. In FIG. 7, a diagram 700 are exemplary driving voltage signals 706, 708, 710, 712 and 714, which includes a driving voltage of 100 volts (V), shown along a frequency axis 702 in hertz (Hz) versus a voltage axis 704 in decibel volts (dBv). The transmitted signal 706 is an acoustic signal through air, while the transmitted signal 708 is an acoustic signal through oil, the transmitted signal 708 is an acoustic signal through oil, the transmitted signal 710 is an acoustic signal through oil-move, transmitted signal 712 is an acoustic signal through oil-move-back and transmitted signal 714 is an acoustic signal through water.

Figure 8:
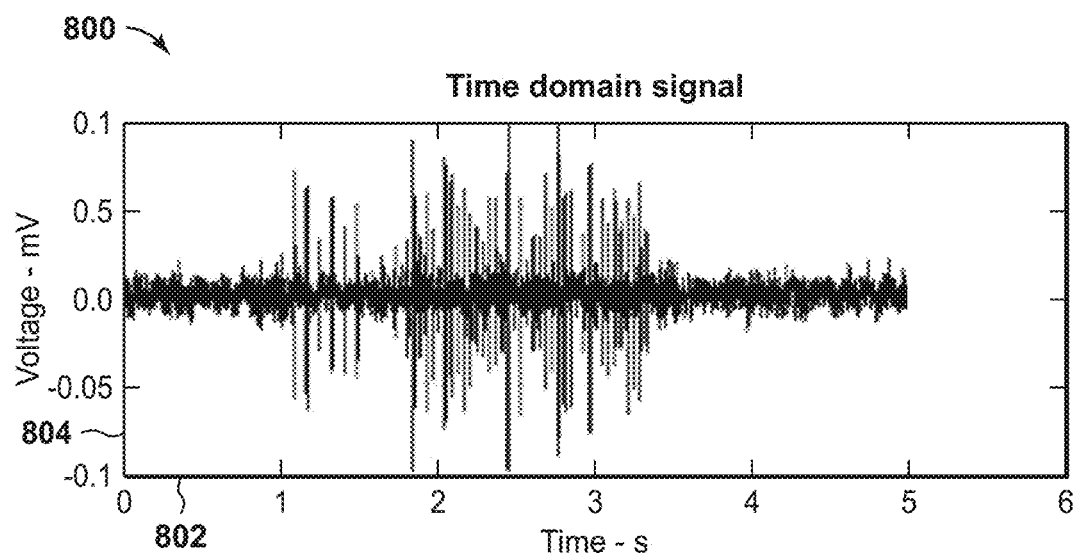
FIG. 8 is an exemplary diagram of a time domain signal in accordance with an embodiment of the present techniques.
Figure 9:
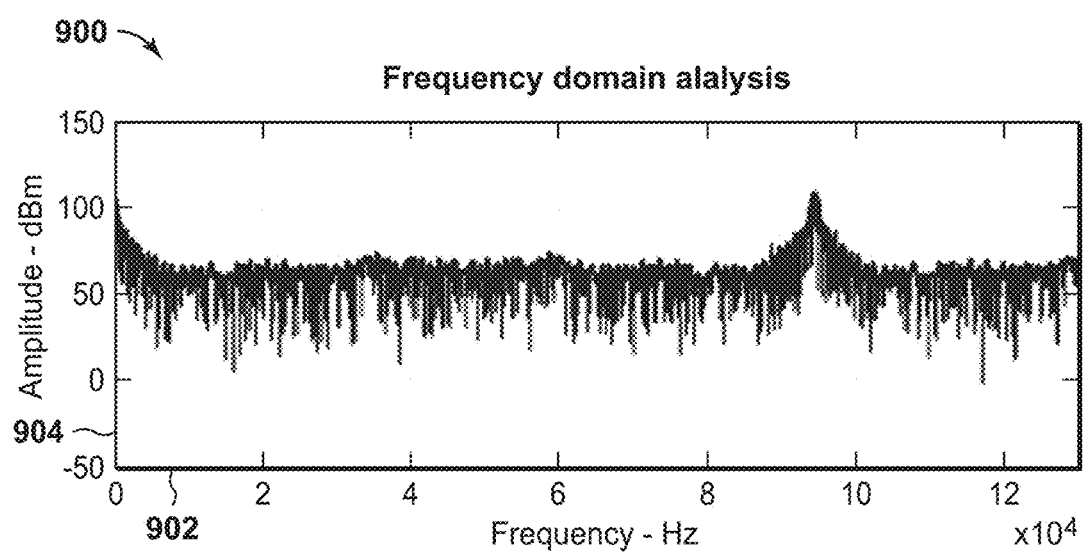
FIG. 9 is yet another exemplary frequency domain signal in accordance with an embodiment of the present techniques.

FIGS. 8 and 9 are acoustic signals during well drilling process that demonstrate in a time domain and a frequency domain, which include drilling noises. The drilling noises may be used for background analysis, which may be easily separated from ultrasonic signals and may be used for medium detections. FIG. 8 is an exemplary diagram 800 of a time domain signal. In FIG. 8, a diagram 800 are an exemplary signal 806 shown along a time axis 802 in time in seconds (s) versus a voltage axis 804 in milli-volts (mV). FIG. 9 is an exemplary diagram 900 of a frequency domain signal. In FIG. 9, a diagram 900 are an exemplary signal 906 shown along a frequency axis 902 in hertz (Hz) versus an amplitude axis 904 in decibels (dBm).

Persons skilled in the technical field will readily recognize that in practical applications of the disclosed methodology, it is partially performed on a computer, typically a suitably programmed digital computer or processor based device. Further, some portions of the detailed descriptions which follow are presented in terms of procedures, steps, logic blocks, processing and other symbolic representations of operations on data bits within a computer memory. These descriptions and representations are the means used by those skilled in the data processing arts to most effectively convey the substance of their work to others skilled in the art. In the present application, a procedure, step, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "processing" or "computing", "calculating", "comparing", "determining", "displaying", "copying," "producing," "storing," "adding," "applying," "executing," "maintaining," "updating," "creating," "constructing" "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

Embodiments of the present techniques also relate to an apparatus for performing the operations herein. This apparatus, such as the control unit or the communication nodes, may be specially constructed for the required purposes, or it may comprise a general-purpose computer or processor based device selectively activated or reconfigured by a computer program stored in the computer (e.g., one or more sets of instructions). Such a computer program may be stored in a computer readable medium. A computer-readable medium includes any mechanism for storing or transmitting information in a form readable by a machine (e.g., a computer). For example, but not limited to, a computer-readable (e.g., machine-readable) medium includes a machine (e.g., a computer) readable storage medium (e.g., read only memory ("ROM"), random access memory ("RAM"), NAND flash, NOR flash, magnetic disk storage media, optical storage media, flash memory devices, etc.), and a machine (e.g., computer) readable transmission medium (electrical, optical, acoustical or other form of propagated signals (e.g., carrier waves, infrared signals, digital signals, etc.)).

Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present techniques are in no way limited to implementation in any specific operating system or environment.

By way of example, the control unit may include a computer system that may be used to perform any of the methods disclosed herein. A central processing unit (CPU) is coupled to system bus. The CPU may be any general-purpose CPU, although other types of architectures of CPU (or other components of exemplary system) may be used as long as CPU (and other components of system) supports the inventive operations as described herein. The CPU may contain two or more microprocessors and may be a system on chip (SOC), digital signal processor (DSP), application specific integrated circuits (ASIC), and field programmable gate array (FPGA). The CPU may execute the various logical instructions according to disclosed aspects and methodologies. For example, the CPU may execute machine-level instructions for performing processing according to aspects and methodologies disclosed herein.

The computer system may also include computer components such as a random access memory (RAM), which may be SRAM, DRAM, SDRAM, or the like. The computer system may also include read-only memory (ROM), which may be PROM, EPROM, EEPROM, or the like. RAM and ROM, which may also include NAND flash and/or NOR flash, hold user and system data and programs, as is known in the art. The computer system may also include an input/output (I/O) adapter, a graphical processing unit (GPU), a communications adapter, a user interface adapter, and a display adapter. The I/O adapter, the user interface adapter, and/or communications adapter may, in certain aspects and techniques, enable a user to interact with computer system to input information.

The I/O adapter preferably connects a storage device(s), such as one or more of hard drive, compact disc (CD) drive, floppy disk drive, tape drive, etc. to computer system. The storage device(s) may be used when RAM is insufficient for the memory requirements associated with storing data for operations of embodiments of the present techniques. The data storage of the computer system may be used for storing information and/or other data used or generated as disclosed herein. The communications adapter may couple the computer system to a network (not shown), which may include the network for the wellbore and a separate network to communicate with remote locations), which may enable information to be input to and/or output from system via the network (for example, a wide-area network, a local-area network, a wireless network, any combination of the foregoing). User interface adapter couples user input devices, such as a keyboard, a pointing device, and the like, to computer system. The display adapter is driven by the CPU to control, through a display driver, the display on a display device.

The architecture of system may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may use any number of suitable structures capable of executing logical operations according to the embodiments.

As may be appreciated, the method may be implemented in machine-readable logic, such that a set of instructions or code that, when executed, performs the instructions or operations from memory. By way of example, the computer system includes a processor; an input device and memory. The input device is in communication with the processor and is configured to receive input data associated with a subsurface region. The memory is in communication with the processor and the memory has a set of instructions, wherein the set of instructions, when executed, are configured to: perform certain operations. By way of example, the communication nodes may be configured to exchange low-frequency signals that are less than or equal to ($\leq$) 20 kilohertz; may be configured to exchange low-frequency signals that are in the range between 100 hertz and 20 kilohertz; may be configured to exchange high-frequency signals that are greater than ($>$) 20 kilohertz; may be configured to exchange high-frequency signals that are in the range between greater than 20 kilohertz and 1 megahertz; and/or may be configured to: i) monitor the wireless network for an event; ii) modify the wireless network if an event is detected; and iii) provide a notification if an event is detected.

It should be understood that the preceding is merely a detailed description of specific embodiments of the invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents. It is also contemplated that structures and features embodied in the present examples can be altered, rearranged, substituted, deleted, duplicated, combined, or added to each other. As such, it will be apparent, however, to one skilled in the art, that many modifications and variations to the embodiments described herein are possible. All such modifications and variations are intended to be within the scope of the present invention, as defined by the appended claims.

The invention claimed is:

1. A method of communicating data among a plurality of communication nodes in a communication network, the method comprising:

obtaining field data for a hydrocarbon system;

creating a communication network configuration based on the obtained field data for a communication network, wherein the communication network includes a plurality of communication nodes;

configuring the plurality of communication nodes based on the communication network configuration;

configuring a control unit based on the communication network configuration and configured to exchange data packets with the plurality of communication nodes;

installing the communication nodes in the hydrocarbon system; and exchanging data packets between the plurality of communication nodes and the control unit to perform hydrocarbon operations for the hydrocarbon system;

wherein installing the communication nodes in the hydrocarbon system comprises:
disposing a first set of communication nodes from the plurality of communication nodes into a first well;
disposing a first topside communication node from the plurality of communication nodes to a first tree associated with the first well;
disposing a second set of communication nodes from the plurality of communication nodes into a second well; and
disposing a second topside communication node from the plurality of communication nodes to a second tree associated with the second well.

2. The method of claim 1, further comprising identifying one or more parameters to be measured for the hydrocarbon system; wherein one or more of the plurality of the communication nodes are configured to detect the one or more parameters.

3. The method of claim 2, wherein each of the one or more of the plurality of communication nodes is configured to detect one of water breakthrough, gas breakthrough and any combination thereof.

4. The method of claim 3, wherein each of the one or more of the plurality of communication nodes is configured to measure one of pressure, temperature, resistivity, capacitance, pH, and any combination thereof.

5. The method of claim 1, further comprising:
obtaining measurements from one or more of the plurality of communication nodes, wherein the plurality of communication nodes are disposed along one or more tubular members;
transmitting the obtained measurement from the one or more of the plurality of communication nodes to the control unit; and
performing hydrocarbon operations based on the obtained measurements.

6. The method of claim 5, wherein each of the one or more of the plurality of communication nodes is configured to detect changes in fluid flow through one of the one or more tubular members.

7. The method of claim 6, wherein each of the one or more of the plurality of communication nodes is configured to measure one of pressure, acoustics, strain, capacitance, resistivity and any combination thereof.

8. The method of claim 1, wherein the first topside communication node is configured to measure fluid flow from the first well; and/or wherein the second topside communication node is configured to measure fluid flow from the second well.

9. The method of claim 1, wherein the first topside communication node is configured to measure fluid composition from the first well; and/or wherein the second topside communication node is configured to measure fluid composition from the second well.

10. The method of claim 1, wherein one of the communication nodes in the first well is configured to measure fluid flow within the first well; and/or wherein one of the communication node in the second node is configured to measure fluid flow within the second well.

11. The method of claim 1, wherein one of the communication nodes in the first well is configured to measure fluid composition within the first well; and/or wherein one of the communication nodes in the second well is configured to measure fluid composition from the second well.

12. The method of claim 1, wherein one of the communication nodes in the first well is configured to measure temperature within the first well; and/or wherein one of the communication node in the second node is configured to measure temperature within the second well.

13. The method of claim 1, wherein one of the communication nodes in the first well is configured to measure pressure within the first well; and/or wherein one of the communication nodes in the second well is configured to measure pressure from the second well.

14. The method of claim 1, wherein the first topside communication node and the second topside communication node are each configured to communicate via one of radio frequencies, physical connections and any combination thereof and the communication nodes with the first well and second well are configured to communicate via acoustically.

15. The method of claim 1, further comprising:
configuring one or more gateway nodes based on the communication network configuration, wherein at least one of the one or more gateway nodes is configured to exchange data packets between the first topside communication node and the control unit based on the communication network configuration and to exchange data packets between the second topside communication node and the control unit based on the communication network configuration;
installing the one or more gateway nodes in the hydrocarbon system; and
exchanging data packets to between the first topside communication node and control unit via the at least one of the one or more gateway nodes and between the second topside communication node and control unit via the at least one of the one or more gateway nodes.

16. The method of claim 1, wherein the creation of the communication network comprises selecting one of one or more frequency bands, one or more individual tones, one or more coding methods, and any combination thereof.

17. The method of claim 1, wherein the communicating between the plurality of communication nodes comprises exchanging low-frequency signals that are less than or equal to (≤) 20 kilohertz.

18. The method of claim 1, wherein the communicating between the plurality of communication nodes comprises exchanging low-frequency signals that are in the range between 100 hertz and 20 kilohertz.

19. The method of claim 1, wherein the communicating between the plurality of communication nodes comprises exchanging high-frequency signals that are greater than (>) 20 kilohertz.

20. The method of claim 1, wherein the communicating between the plurality of communication nodes comprises exchanging high-frequency signals that are in the range between greater than 20 kilohertz and 1 megahertz.

21. The method of claim 1, further comprising determining whether to adjust hydrocarbon operations based on the exchanged data packets to between the plurality of communication nodes and the control unit.

22. The method of claim 21, further comprising performing the adjustment to hydrocarbon operations based on the determination.

23. The method of claim 1, wherein the field data is associated with equipment installed within the wellbores and associated wellbore equipment.

24. The method of claim 1, further comprising modeling fluid compositions in the hydrocarbon system based on the data packets.

25. A hydrocarbon system comprising:
- a plurality of wellbores in a hydrocarbon system;
- a plurality of tubular members disposed in the plurality of wellbores;
- a communication network associated with the hydrocarbon system, wherein the communication network comprises a plurality of communication nodes, a plurality of topside nodes and one or more gateway nodes that are configured to communicate operational data between two or more of the plurality of communication nodes during hydrocarbon operations, plurality of topside nodes and one or more gateway nodes; and
- a control unit associated the hydrocarbon system and configured to exchange data packets with the plurality of communication nodes.

* * * * *